US012808778B2

(12) United States Patent
Badin et al.

(10) Patent No.: US 12,808,778 B2
(45) Date of Patent: Nov. 24, 2026

(54) NESTED SLIT DESIGN FOR SINGLE RECEIVING OPTICAL CHANNEL PARTICULATE SENSOR

(71) Applicant: Honeywell International s.r.o., Prague (CZ)

(72) Inventors: Pavel Badin, Brno (CZ); Viktor Drazan, Brno (CZ); Thomas Dobbins, Watertown, MN (US); Zbynek Drasal, Prague (CZ); Jan Pekarek, Brno (CZ)

(73) Assignee: Honeywell International s.r.o., Prague (CZ)

( * ) Notice: Subject to any disclaimer, the term of this patent is extended or adjusted under 35 U.S.C. 154(b) by 106 days.

(21) Appl. No.: 18/913,779

(22) Filed: Oct. 11, 2024

(65) Prior Publication Data

US 2025/0271350 A1 Aug. 28, 2025

Related U.S. Application Data

(60) Provisional application No. 63/556,762, filed on Feb. 22, 2024.

(51) Int. Cl.
*G01N 21/01* (2006.01)
*G01N 21/85* (2006.01)

(52) U.S. Cl.
CPC ......... *G01N 21/01* (2013.01); *G01N 21/8507* (2013.01); *G01N 2021/8578* (2013.01);
(Continued)

(58) Field of Classification Search
CPC ............... G01N 21/01; G01N 21/8507; G01N 2021/8578; G01N 2201/0214;
(Continued)

(56) References Cited

U.S. PATENT DOCUMENTS 8,466,435 B2 6/2013 Toishi et al.
8,941,081 B2 * 1/2015 Suzuki ............... G01N 21/6486 356/336
(Continued)

OTHER PUBLICATIONS

Thorlabs, "Bandpass Filter Tutorial", as downloaded May 10, 2024 from https://www.thorlabs.com/newgrouppage9_pf.cfm?guide=10&category_id=&objectgroup_id=10772, pp. 1 through 2.
(Continued)

*Primary Examiner* — Tony Ko
(74) *Attorney, Agent, or Firm* — Fogg & Powers LLC

(57) ABSTRACT

Systems and methods for a nested slit design for a single receiving optical channel particulate sensor are described herein. An apparatus can function as an optical slit that receives optical signals from detection volumes and have an angle with respect to a receiving optics axis, wherein the angle is associated with the angle between an optical signal beam axis and the receiving optics axis. The apparatus includes an inner optical slit region having a first width and height associated with a first optical signal, an outer optical slit region having a second width and height associated with a second optical signal, and a blocking slit region configured to block the first and second optical signals. Further, the inner optical slit region is associated with a first and second optical signal wavelength, and the outer optical slit region is associated with the second optical signal wavelength.

19 Claims, 14 Drawing Sheets

(52) U.S. Cl.
CPC ................ *G01N 2201/0214* (2013.01); *G01N 2201/0668* (2013.01)

(58) Field of Classification Search
CPC ... G01N 2201/0668; G01N 2015/0046; G01N 2015/1493; G01N 15/1434; G01N 15/0205; G02B 5/201
See application file for complete search history.

(56) References Cited

U.S. PATENT DOCUMENTS

| | | | |
|---|---|---|---|
| 9,222,873 | B2 | 12/2015 | Baumgardner et al. |
| 10,591,422 | B2 | 3/2020 | Fan et al. |
| 10,640,218 | B2 | 5/2020 | Baudouin et al. |
| 10,816,661 | B2 | 10/2020 | Ray et al. |
| 11,080,874 | B1 | 8/2021 | Bardagjy |
| 11,706,506 | B2 | 7/2023 | Okada et al. |
| 11,827,365 | B2 | 11/2023 | Anderson et al. |
| 2022/0341839 | A1 | 10/2022 | Baumgardner et al. |

OTHER PUBLICATIONS

European Patent Office, "Extended European Search Report", dated May 16, 2025, from U.S. Appl. No. 18/913,779, from Foreign Counterpart to U.S. Appl. No. 18/913,779, pp. 1 through 10, Published: EP.

* cited by examiner

NESTED SLIT DESIGN FOR SINGLE RECEIVING OPTICAL CHANNEL PARTICULATE SENSOR

CROSS-REFERENCE TO RELATED APPLICATIONS

This application claims the benefit of U.S. provisional application 63/556,762, filed on Feb. 22, 2024, and titled "SINGLE RECEIVING OPTICAL CHANNEL SENSOR," which is hereby incorporated herein by reference in its entirety.

STATEMENT REGARDING FEDERALLY SPONSORED RESEARCH OR DEVELOPMENT

The project leading to this application has received funding from the Clean Aviation Joint Undertaking under grant agreement No. 101102008 under European Union's Horizon 2020 research and innovation programme.

BACKGROUND

Aircraft systems use ice detection systems to identify conditions likely to lead to ice formation. Some of these ice detection systems are mounted on vehicles and include multiple sensors that acquire information from the immediate environment of an associated aircraft for different icing conditions associated with the characteristics of different ice formation conditions. For example, different sensors can detect the different icing conditions defined by the FAA, known as the Appendix C, O, and D/P icing conditions. Vehicles, and in particular aircraft, use the detected ice conditions to mitigate dangerous effects of ice formation on the body of the vehicle. Additionally, aircraft systems use particle detection sensors to characterize the risk posed by other airborne material that can affect aircraft operation like volcanic ash, sand, or dust. The measured data can be used to identify hazardous conditions to the aircraft and for predicting the operational health and maintenance needs of various aircraft components.

SUMMARY

Systems and methods for a nested slit design for a single receiving optical channel particulate sensor are described herein. In certain embodiments, an apparatus is configured to function as an optical slit that receives multiple optical signals from multiple detection volumes, the apparatus having an angle with respect to a receiving optics axis, wherein the angle is associated with the angle between an optical signal beam axis and the receiving optics axis, the apparatus includes an inner optical slit region having a first width and a first height, wherein the first width is associated with a first optical signal in the multiple optical signals having a first optical signal beam width, and the first height is associated with a first sensor sampling range. The apparatus also includes an outer optical slit region having a second width and a second height, wherein the second width is associated with a second optical signal in the multiple optical signals having a second optical signal beam width, and the second height is associated with a second sensor sampling range. The apparatus further includes a blocking slit region configured to block the first optical signal and the second optical signal that are incident on the blocking slit region. Further, the inner optical slit region is associated with a first optical signal wavelength and a second optical signal wavelength, wherein the outer optical slit region is associated with the second optical signal wavelength. Additionally, the inner optical slit region is nested within the outer optical slit region and the outer optical slit region is nested within the blocking slit region.

BRIEF DESCRIPTION OF THE DRAWINGS

Drawings accompany this description and depict only some embodiments associated with the scope of the appended claims. Thus, the described and depicted embodiments should not be considered limiting in scope. The accompanying drawings and specification describe the exemplary embodiments, and features thereof, with additional specificity and detail, in which:

Figure 1:
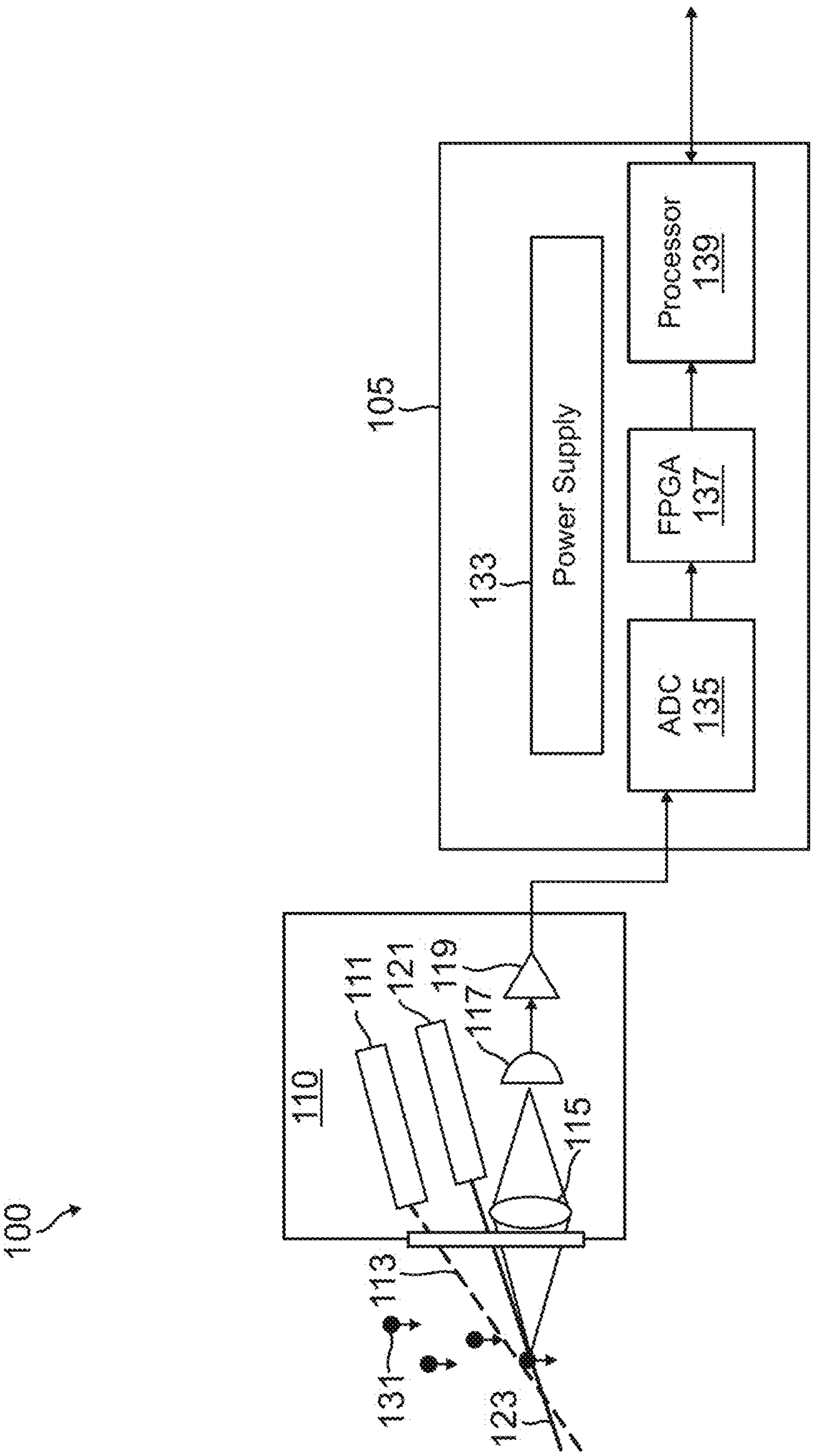
FIG. 1 is a block diagram of a single-channel optical sensor for detecting multiple icing conditions according to an aspect of the present disclosure.

Per common practice, the drawings do not show the various described features according to scale, but the drawings show the features to emphasize the relevance of the features to the example embodiments.

DETAILED DESCRIPTION

The following detailed description refers to the accompanying drawings that form a part of the present specification. The drawings, through illustration, show specific illustrative embodiments. However, it is to be understood that other embodiments may be used and that logical, mechanical, and electrical changes may be made.

Systems and methods for a nested slit design for a single receiving optical channel particulate sensor are described herein. In certain embodiments, a sensor includes at least one optical signal source. For example, the sensor may include a first optical signal source that emits a first optical signal at a first wavelength and a second optical signal source that emits a second optical signal at a second wavelength. The sensor then directs the first and second optical signals towards multiple detection volumes.

Additionally, the first optical signal emitted from the sensor may have a narrower beam width and height than the second optical signal. As such, the detection volume illuminated by the first optical signal may be smaller than the detection volume illuminated by the second optical signal. Because of the different size of the detection volumes, the different optical signals may be used to detect different particle types and sizes and resultant conditions associated with the differences.

Within the multiple detection volumes, when a particle passes through the path of the first or second optical signal, the first and second optical signals are reflected or scattered off of the particle. When the particle interacts with first or second optical signal at certain distances from the sensor, some of the reflected or scattered light may be received by one or more photodetectors through a single receiving optical channel. The certain distances from the sensor, where reflected or scattered light reaches the one or more photodetectors are called sensor sampling range. The single receiving optical channel directs the light towards one or more photodetectors, where electrical signals can be generated that contain information about the particles interrogated by the first and second optical signals within the respective detection volumes. Further, by receiving both optical signals through a single receiving optical channel, the sensor can be made lighter, smaller with reduced cost.

Additionally, to receive both the first and second optical signals through the single receiving optical channel, the sensor may pass the reflected or scattered light through a slit having three regions, an inner optical slit region, an outer optical slit region, and a blocking slit region. The inner optical slit region is nested within the outer optical slit region, and the outer optical slit region is nested within the blocking slit region. The first optical signal wavelength can pass through the inner optical slit region and is blocked by the outer optical slit region and by the blocking slit region. Therefore, the slit size for the first optical signal having the first wavelength is equal to the width and height of the inner optical slit region. The second optical signal wavelength can pass through the inner and outer optical slit regions and is blocked by the blocking slit region. Therefore, the slit size for the second optical signal having the second wavelength is given by the width and height of the outer optical slit region. Further, the inner optical slit region is associated with the first wavelength, which has a smaller and high-energy density beam profile, and the outer optical slit region is associated with the second wavelength, which has a larger and low-energy density beam profile. As such, the inner optical slit region is suited for detecting the smaller particles associated with the smaller and high-energy density beam profile, and the outer optical slit region is suited for detecting larger particles associated with the larger and low-energy density beam profile. Accordingly, the sensor can receive light from both the first and second optical signals through the slit, allowing the detection of particles of different sizes where the detecting sensor includes only a single receiving optical channel.

The systems and methods described herein address issues found in typical sensors for identifying multiple icing conditions and for detecting other particles like ash, sand, dust, aerosols, and the like. In particular, typical systems employ multiple optical channels that emit separate optical signals to detect the presence of particles that pass within the respective emitted beams. Additionally, the different optical channels also separately receive light that is scattered or reflected off of the particles. While these systems may identify multiple icing conditions, the use of multiple optical channels for both transmitting and receiving the optical signals leads to a system that is large, heavy, and expensive due to the optical components needed to implement the separate optical channels.

FIG. 1 is a block diagram of system 100 for detecting multiple icing conditions through a single receiving optical channel. As illustrated, the system 100 includes a single receiving optical channel 110. The optical channel 110 emits optical signals to detect the presence of particles 131 that pass within a detection volume for the emitted optical signals. When the optical channel 110 receives and detects light reflected/scattered off of the particles 131, the resultant electrical signals are provided to electronics 105 for additional processing to determine whether particles 131 are present that are likely to form ice on the body of an associated vehicle.

In certain embodiments, the optical channel 110 may include a first optical signal source 111 that emits a first optical signal 113 at a first wavelength and a first beam width. The first optical channel 110 may also include a second optical signal source 121 that emits a second optical signal 123 at a second wavelength and a second beam width. For example, the beam width of the first optical signal 113 may be associated with small, supercooled water droplets that are likely to freeze on contact with the surface of a vehicle. In particular, the small water droplets may be similar to those described by the Federal Aviation Administration (FAA) in Appendix C. The sensor may sense smaller particles, such as water droplets, ice crystals, ash, sand, dust, and other aerosol particles. When a small particle 131 passes through the detection volume of the first optical signal 113, the particle 131 will scatter and/or reflect light that may be received by the system 100 and be incident on optics 115 within the optical channel 110. Similarly, the beam width of the second optical signal 123 may be associated with large, supercooled water droplets that are likely to freeze in a glaze on the surface of the vehicle. In particular, the large water droplets may be similar to those described by the FAA in Appendix O. The sensor may sense larger particles, such as water droplets, ice crystals, ash, sand, dust and other aerosol particles. When a larger particle 131 passes through the detection volume of the second optical signal 123, the particles 131 will scatter and/or reflect light that may be received by the system 100 and be incident on optics 115 within the optical channel 110. The combination of optical signals enables the sensing of both smaller and larger particles, allowing it to properly characterize Appendix C, O, D/P conditions as well as ash, sand, dust and other aerosol conditions present in the atmosphere.

In further embodiments, the optics 115 may direct the received light onto a photodetector 117, which converts the received light into an electrical signal and passes the received electrical signals to an amplifier 119. The amplifier 119 then amplifies the signal and provides the signal to electronics 105. In certain embodiments, the optics 115 include a slit that allows light to pass through different regions, where the area size of the regions that the light can pass through of the optical slit is dependent on the frequency of the light.

In additional embodiments, the electronics 105 are powered by a power supply 133. The electronics 105 are also coupled to the optical channel 110. Accordingly, the electronics 105 receive the electrical signals from the optical channel 110 at an analog-to-digital converter (ADC) 135. The ADC 135 receives the analog electrical signals and converts them into digital signals for additional processing by the FPGA 137 and the processor 139. The FPGA 137 and the processor 139 function together to interpret the information and identify the present icing conditions. In some implementations, the FPGA 137 and the processor 139 identify different icing conditions based on the frequency of the light emitted from the optical channel 110. For example, if the first optical signal source 111 emits a signal, the electronics 105 may process the received signals for particles associated with the beam width of the first optical signal source 111. Also, if the second optical signal source 121 emits a signal, the electronics 105 may process the received signals for particles associated with the beam width of the second optical signal source 121.

The processor 139 and the FPGA 137 may execute instructions that direct the processor 139 and the FPGA 137 to process received signals for particle detection. The processor 139 and the FPGA 137 may be a single processor or a device that includes combinations of general-purpose processors, multi-core processors, multiple processors, dedicated circuitry, and the like. The functions performed may be implemented using software, firmware, hardware, or any appropriate combination thereof. Processors and other computational devices may be supplemented by, or incorporated in, specially-designed application-specific integrated circuits (ASICs) or field programmable gate arrays (FPGAs). Processors and other computational devices can also include or function with software programs, firmware, or other computer-readable instructions for performing various process tasks, calculations, and control functions used in the present methods and systems.

The present methods may be implemented by computer-executable instructions, such as program modules or components executed by the processor or other computational devices. Generally, program modules include routines, programs, objects, data components, data structures, algorithms, and the like, which perform particular tasks or implement particular abstract data types.

In addition to the processors, the processors may also interface with a memory. The memory may be any suitable computer-readable storage media that includes, for example, non-volatile memory devices, including semiconductor memory devices such as random access memory (RAM), read-only memory (ROM), electrically erasable programmable ROM (EEPROM), or flash memory devices; magnetic disks such as internal hard disks or removable disks; optical storage devices such as compact discs (CDs), digital versatile discs (DVDs), Blu-ray discs, or other media that can carry or store desired program code as computer-executable instructions or data structures.

Figure 2:
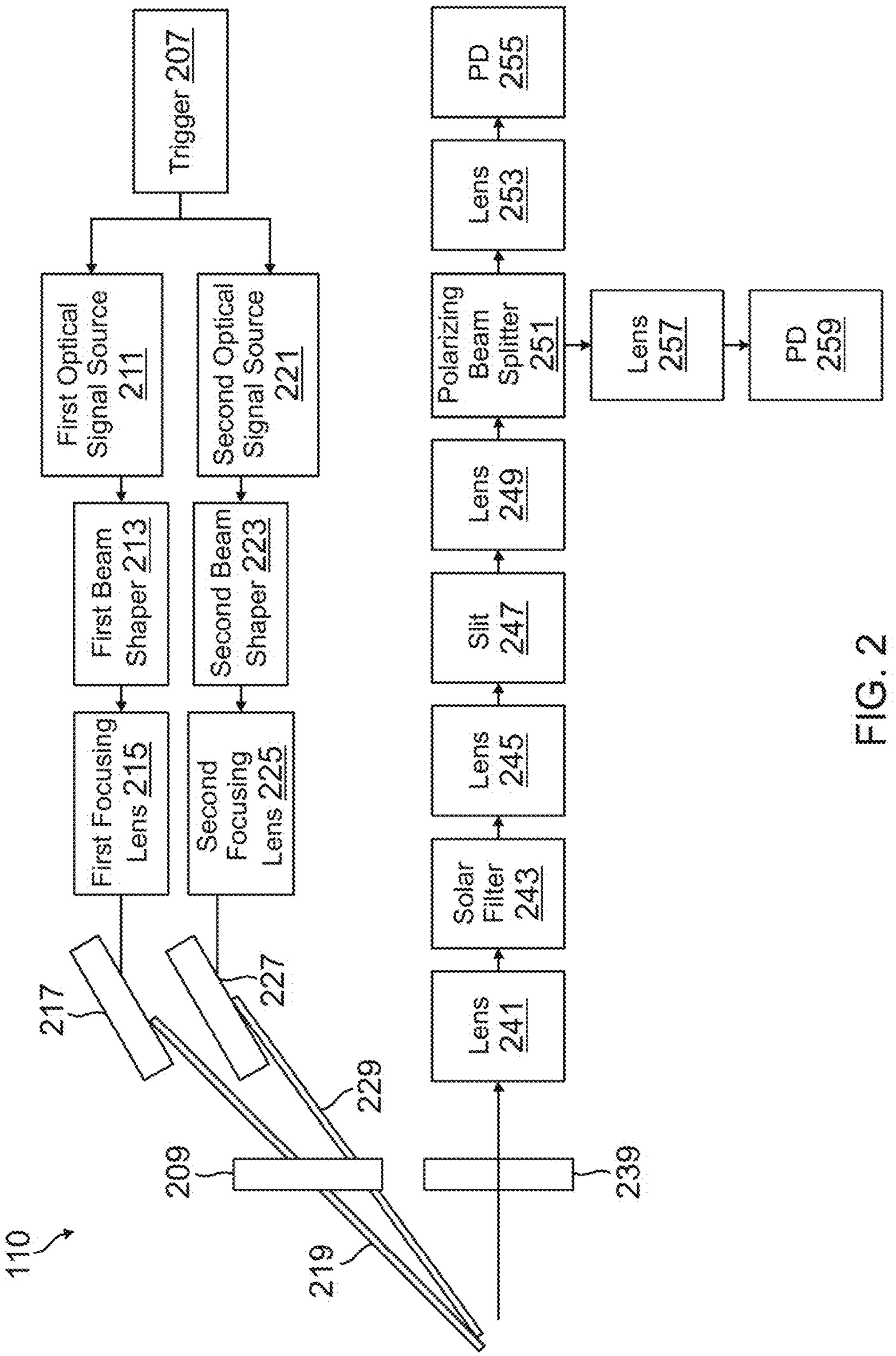
FIG. 2 is a functional block diagram for detecting multiple icing conditions according to an aspect of the present disclosure.

FIG. 2 is a block diagram illustrating an exemplary embodiment of the optical channel 110 described in FIG. 1. As illustrated, the optical channel 110 includes a first optical signal source 211 and a second optical signal source 221. The first optical signal source 211 and the second optical signal source 221 may be laser sources such as vertical cavity surface emitting lasers, gas/solid state lasers, light emitting diodes, or other sources capable of generating optical signals. The first optical signal source 211 generates a first optical signal 219 having a first wavelength, and the second optical signal source 221 generates a second optical signal 229 having a second wavelength. Additionally, the first optical signal source 211 may generate the first optical signal 219 when the second optical signal source 221 is switched off, and the second optical signal source 221 may generate the second optical signal 229 when the first optical signal source 211 is switched off. To control switching between the first optical signal source 211 and the second optical signal source 221, the optical channel 110 may include a trigger 207 that functions as a controller that selects which of the first optical signal source 211 and the second optical signal source 221 provides the optical signal emitted towards the detections volume.

In some embodiments, the first optical signal source 211 provides the first optical signal 219 to a first beam shaper 213. The first beam shaper 213 alters the first optical signal 219 to have a beam width associated with a first particle size range, as described above. The first beam shaper 213 may also convert an input optical beam profile into another beam profile. For example, the first beam shaper 213 may convert an input optical beam profile from a Gaussian profile into a Flat-Top profile. After shaping the beam, the first optical signal 219 is provided to a first focusing lens 215. The first focusing lens 215 focuses the first optical signal 219 for emitting towards a first detection volume. To further direct the first optical signal 219 towards the detection volume, the first focusing lens 215 directs the first optical signal 219 towards a first mirror 217, where the first mirror 217 directs the first optical signal 219 through a transmit window 209 (such as a sapphire window) towards the first detection volume.

Similarly, the second optical signal source 221 provides the second optical signal 229 to a second beam shaper 223. The second beam shaper 223 alters the second optical signal 229 to have a width associated with a second particle size range, as described above. The second beam shaper 223 may also convert input optical beam profile into another beam profile, for example, converting the input optical beam from a Gaussian profile into a Flat-Tope profile. After shaping the beam, the second optical signal 229 is provided to a second focusing lens 225. The second focusing lens 225 focuses the second optical signal 229 for emitting towards a second detection volume. To further direct the second optical signal 229 towards the second detection volume, the second focusing lens 225 directs the second optical signal 229 towards a second mirror 227, where the second mirror 227 directs the second optical signal 229 through the transmit window 209 towards the second detection volume.

When the first optical signal 219 is emitted through the transmit window 209, and a particle passes through the first detection volume, the particle will reflect or scatter some of the first optical signal 219 through the receive window 239. Similarly, when the second optical signal 229 is emitted through the transmit window 209, and a particle passes through the second detection volume, the particle will reflect or scatter some of the second optical signal 229 through the receive window 239.

In certain embodiments, when the light is received through the receive window 239, the light may be received by a lens 241. The lens 241 may collimate the light and direct the light to a solar filter 243. The solar filter 243 may block light with different frequencies than the first optical signal 219 and the second optical signal 229. For example, the first optical signal 219 and the second optical signal 229 may have similar frequencies within the passband of the solar filter 243. Alternatively, the first optical signal 219 and the second optical signal 229 may have different frequencies associated with separate passbands of the solar filter 243. Thus, the solar filter 243 prevents too much sunlight from entering the optics, increasing the sensitivity to the first optical signal 219 and the second optical signal 229.

In additional embodiments, after passing through the solar filter 243, the first optical signal 219 and the second optical signal 229 pass through a second lens 245 that focuses the first optical signal 219 and the second optical signal 229 onto a slit 247. The slit 247 includes different portions associated with the first optical signal 219 and the second optical signal 229. For example, the first optical signal 219 may be associated with an inner optical slit region that allows light from both the first optical signal 219 and the second optical signal 229 to pass through. The inner optical slit region is positioned within an outer optical slit region, where the portions of the outer optical slit region that are not part of the inner optical slit region block the first optical signal 219 while allowing the second optical signal 229 to pass through. Thus, the size of the inner optical slit region and the outer optical slit region are associated with the beam widths of the first optical signal 219 and the second optical signal 229 emitted by the focusing lens 215 and 225.

In further embodiments, light that passes through the slit 247 is incident on an additional lens 249, which focuses any light onto a polarizing beam splitter 251. The polarizing beam splitter 251 splits light based on the polarization of the light. In particular, the polarizing beam splitter 251 directs light having a first polarization in a first direction and directs light having a second polarization in a second direction. For example, light scattered off of water droplets may affect the polarity of light differently than ice crystals. Thus, based on the polarization of the received light in the first optical signal 219 and the second optical signal 229, a system, like the electronics 105, can determine additional characteristics about the particles passing through detection zones of the first optical signal 219 and the second optical signal 229. In particular, a system can determine the type of aerosol particle, such as water droplets, ice crystals, ash, sand, dust and other aerosol particles.

In certain embodiments, the polarizing beam splitter 251 directs light having a first polarization along a first path towards a lens 253. Additionally, the polarizing beam splitter 251 directs light having a second polarization along a second path towards a lens 257. Along the first path, the first lens 253 focuses incident light towards a photodetector 255. The photodetector 255 produces a first electrical signal from the detected light having a first polarization. Similarly, along the second path, the second lens 257 focuses incident light towards a photodetector 259. The photodetector 259 then produces a second electrical signal from the detected light having a second polarization. The first electrical signal and the second electrical signal are then provided to an additional system for further processing.

When the first optical signal 219 is emitted through the transmit window 209, and a particle passes through the first optical signal beam which is not a part of the first detection volume, the particle will reflect or scatter some of the first optical signal 219 through the receive window 239. The reflected or scattered light from positions outside the first sampling volume will be projected to the outer optical slit region 247 or to the blocking slit region 247, and the first optical signal will not reach any of the sensor photodetectors 255 or 259 and will not be detected by the sensor photodetectors 255 or 259. Similarly, when the second optical signal 229 is emitted through the transmit window 209, and a particle passes through the second optical signal beam which is not a part of the second detection volume, the particle will reflect or scatter some of the second optical signal 229 through the receive window 239. The reflected or scattered light from positions out of the second sampling volume will be projected to the blocking slit region 247 and the second optical signal will not reach any of the sensor photodetectors 255 or 259 and will not be detected by the sensor photodetectors 255 or 259.

Figure 3A:
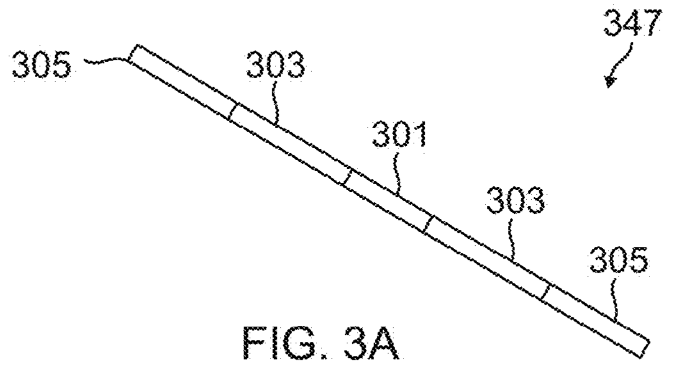
FIG. 3A-3C is a cross-section view of a slit and light having a first wavelength passing through the slit according to an aspect of the present disclosure.
Figure 3B:
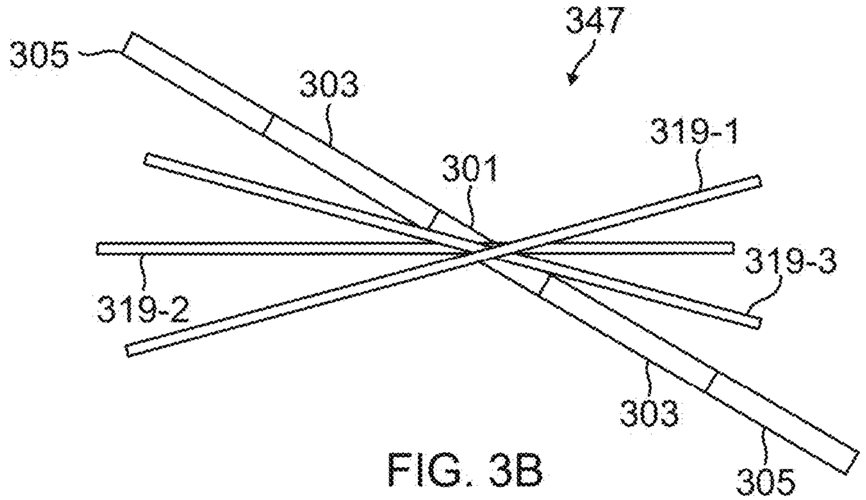
Figure 3C:
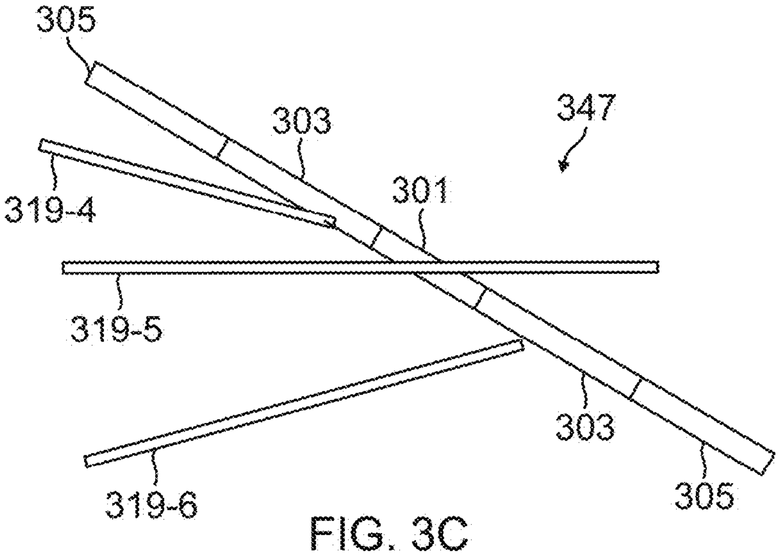

FIGS. 3A-3C illustrate a cross-section of a slit 347. FIG. 3A illustrates a slit 347 having three separate regions—an inner optical slit region 301, an outer optical slit region 303, and a blocking slit region 305. The inner optical slit region 301 is a region having a width associated with the beam width of a first optical signal and a height associated with a sensor first sampling range, like the first optical signal 219 in FIG. 2. The inner optical slit region 301 is located within the outer optical slit region 303, which is a region having a width associated with the beam width of a second optical signal and a height associated with a sensor second sampling range, like the second optical signal 229 in FIG. 2. The first optical signal can pass through the inner optical slit region 301 but is blocked by the outer optical slit region 303 and the blocking slit region 305. The second optical signal can pass through the inner optical slit region 301 and the outer optical slit region 303 but is blocked by the blocking slit region 305.

FIGS. 3B-3C illustrate a cross-section where photons 319-1-319-6 in the first optical signal are incident on the slit 347. As shown in FIG. 3B, the different photons 319-1-319-3 are incident on the inner optical slit region 301. The inner optical slit region 301 may be a window or an optical filter with a passband covering the frequencies of the first and second optical signals. As the inner optical slit region 301 allows the first and second optical signals to pass through, the photons 319-1-319-3 pass through the inner optical slit region 301. FIG. 3C illustrates a cross-section where photons 319-4-319-6 in the first optical signal are incident on both the inner optical slit region 301 and the outer optical slit region 303. For example, the photon 319-5 is incident on the inner optical slit region 301 and passes through. However, the photons 319-4 and 319-6 are incident on the outer optical slit region 303. The outer optical slit region 303 may be an edge filter, bandpass filter, or other type of optical filter that allows the frequency of the second optical signal to pass through while rejecting the frequency of the first optical signal. Accordingly, the outer optical slit region 303 blocks the photons 319-4 and 319-6.

Figure 4A:
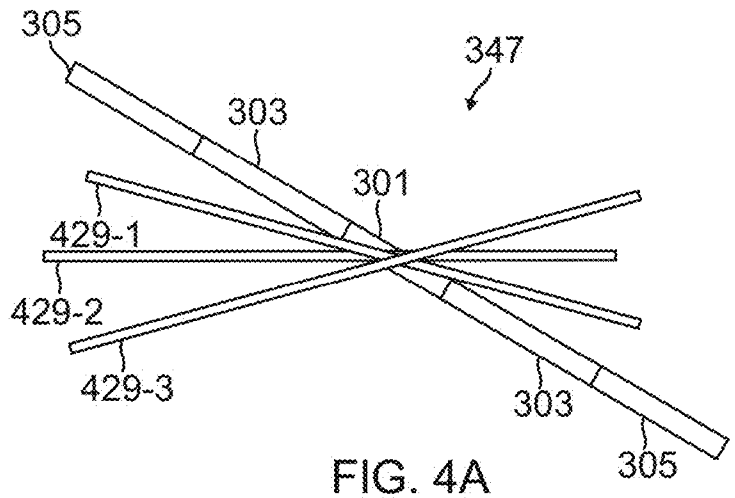
FIG. 4A-4C is a cross-section view of a slit and light having a second wavelength passing through the slit according to an aspect of the present disclosure.
Figure 4B:
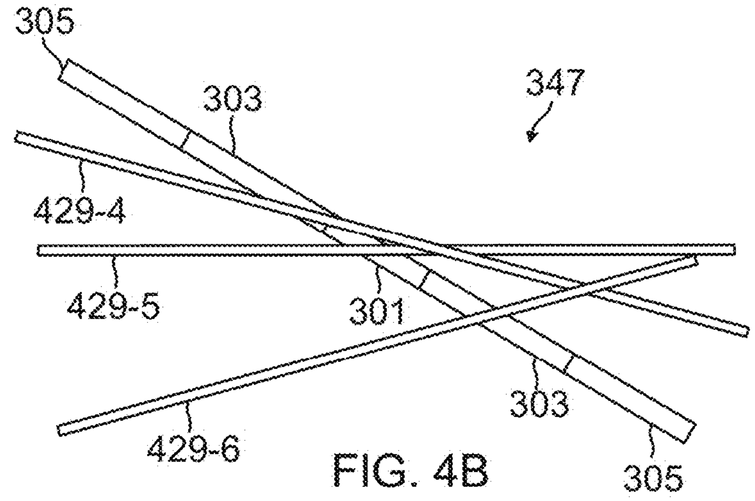
Figure 4C:
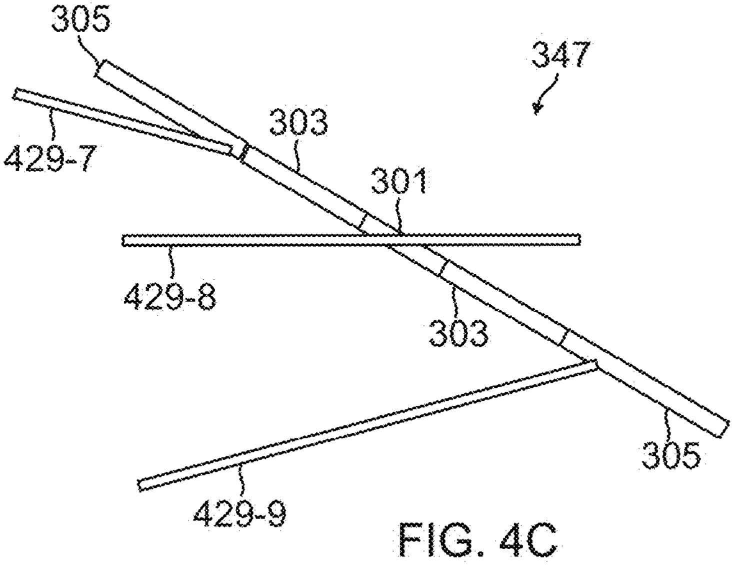

FIGS. 4A-4C illustrate a cross-section of a slit 347 where the photons 429-1-429-9 of the second optical signal are incident on the slit 347. For example, FIG. 4A illustrates photons 429-1-429-3 as being incident on the inner optical slit region 301. As the inner optical slit region 301 allows light to pass through, the photons 429-1-429-3 pass through the inner optical slit region 301. Further, FIG. 4B illustrates photons 429-4-429-6 as being incident on the inner optical slit region 301 and the outer optical slit region 303. For example, the photon 429-5 is incident on the inner optical slit region 301 and passes through the inner optical slit region 301. However, the photons 429-4 and 429-6 are incident on the outer optical slit region 303. As described above, the outer optical slit region 303 passes light with the frequency of the second optical signal. Thus, the photons 429-4 and 429-6 pass through the outer optical slit region 303. FIG. 4C illustrates photons 429-7-429-9 as being incident on the inner optical slit region 301 and the blocking slit region 305. The photon 429-8 is incident on the inner optical slit region 301 and passes through the inner optical slit region 301. However, the photons 429-7 and 429-9 are incident on the blocking slit region 305, which blocks all light. Thus, the photons 429-7 and 429-9 are blocked by the blocking slit region 305.

Figure 5:
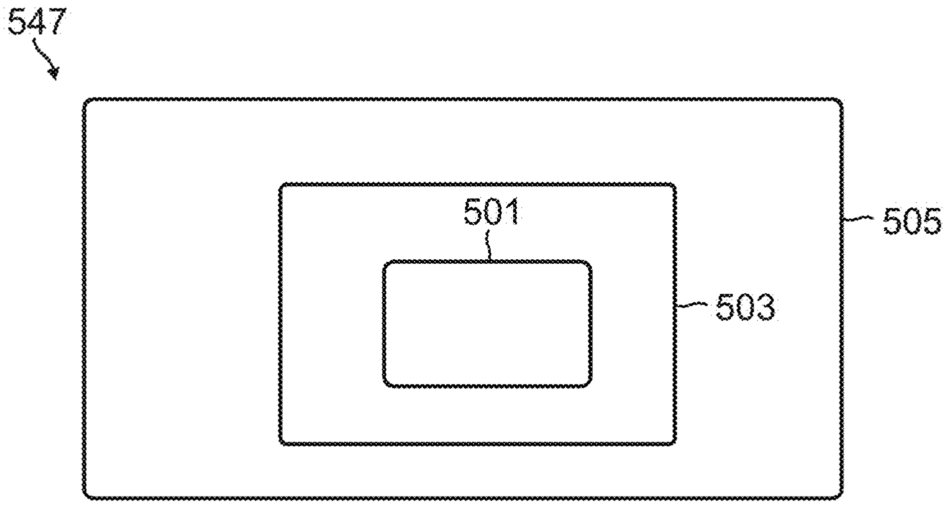
FIG. 5 is a block diagram illustrating a slit according to an aspect of the present disclosure.

FIG. 5 illustrates another view of a slit showing the different components of a slit 547. In particular, the slit 547 illustrates a slit having an inner optical slit region 501, an outer optical slit region 503, and a blocking slit region 505. As shown, the inner optical slit region 501 is located within the outer optical slit region 503 and allows the first optical signal 219 and the second optical signal 229 to pass through the inner optical slit region 501. The inner optical slit region 501 may be a window or an optical filter with a passband including the frequency of the first optical signal 219 and the second optical signal 229. The outer optical slit region 503 that surrounds the inner optical slit region 501 blocks the first optical signal 219 and allows the second optical signal 229 to pass through. Blocking slit region 505 blocks the first optical signal 219, the second optical signal 229, and light generally.

Figure 6A:
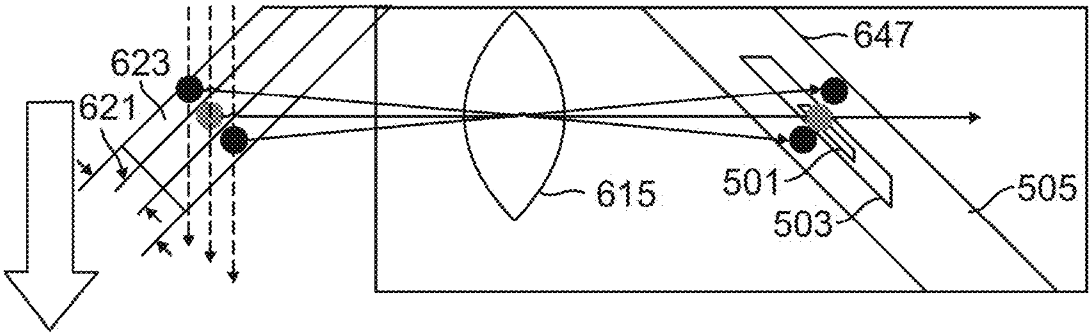
FIGS. 6A-6C are diagrams illustrating reflected light received through a nested slit according to an aspect of the present disclosure.
Figure 6B:
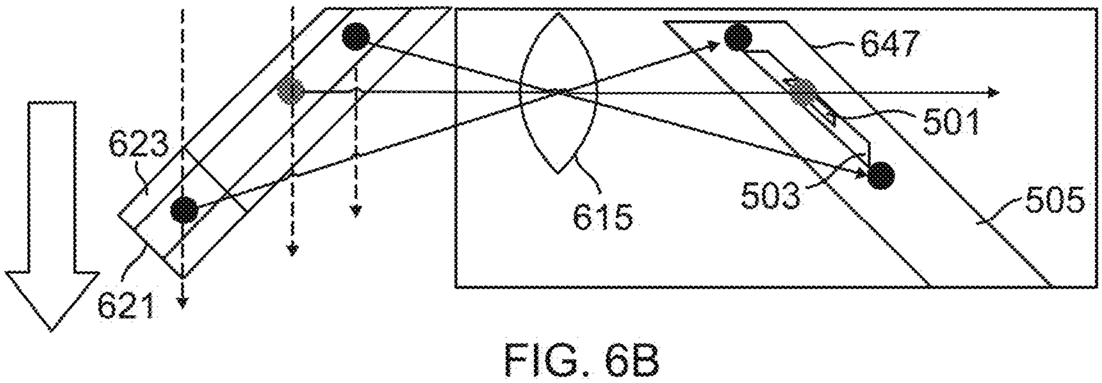
Figure 6C:
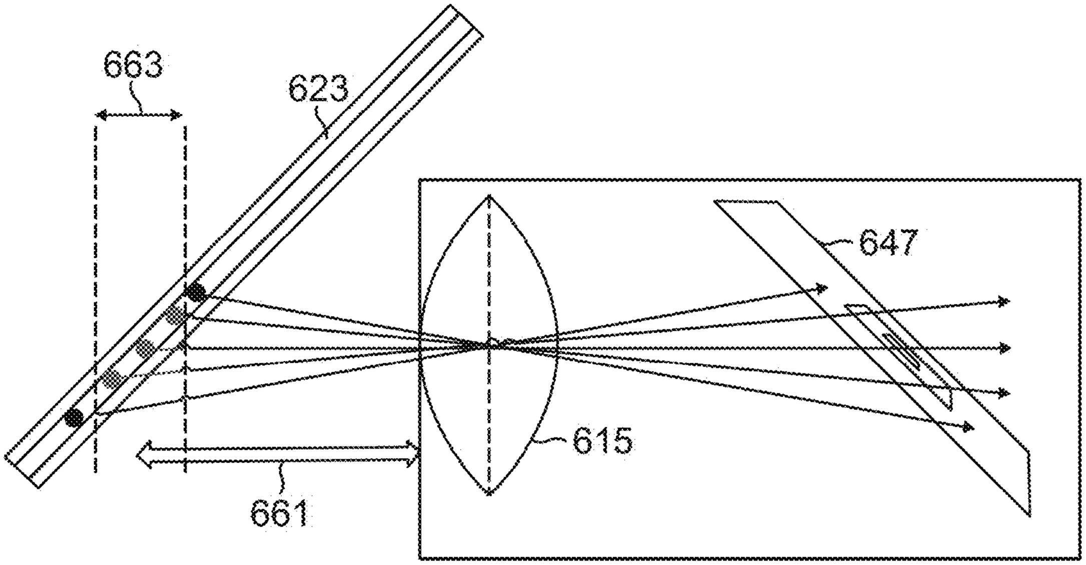

FIGS. 6A-6C illustrate particle projections on a slit 647 for illustrating the general functionality of the slit 647. FIG. 6A describes second optical signal beam width and how it is associated with the width of outer optical slit region 503. Particles passing through a homogeneous region 621 of the second optical signal, which is described by the second optical signal beam width, reflect/scatter light which is projected by a lens 615 to the outer optical slit region 503 and the inner optical slit region 501. As the second optical signal is allowed to pass both through the inner optical slit region 501 and the outer optical slit region 503, the reflected light passes through the slit 647 and reaches the photodetector. Particles passing through the homogeneous region 621 of the second optical signal are therefore detected by the photodetector sensor. Particles passing outside of the homogeneous region 621, through a non-homogeneous region 623, of the second optical signal, reflect/scatter light which is projected by lens to the blocking slit region 505. As the blocking slit region 505 is configured to block all optical signals, it blocks the second optical signal and does not allow it to reach the photodetector. Particles passing through the non-homogeneous region 623 and out of the homogeneous region 621 of the second optical signal are therefore not detected by the photodetector sensor.

Particles interact with the first optical signal according to similar principles. In particular, a first optical signal beam width is associated with the width of an inner optical slit region. Here, the particles passing through a homogeneous region of first optical signal, which is described by the first optical signal beam width, reflect/scatter light which is projected by the lens 615 to the inner optical slit region 501. As the first optical signal is allowed to pass through the inner optical slit region 501, the reflected light passes through the slit and reaches the photodetector. Particles passing through the homogeneous region of the first optical signal are therefore detected by the photodetector sensor. Particles passing outside of the homogeneous region of the first optical signal, reflect/scatter light that is projected by the lens 615 to the outer optical slit region 503 and to the blocking slit region 505. As the outer optical slit region 503 and the blocking slit region 505 are configured to block the first optical signal, the first optical signal is blocked and does not reach the photodetector. Particles passing outside of the homogeneous region of first optical signal are therefore not detected by the sensor.

FIG. 6B describes how sensor sampling range for the second optical signal is associated with the height of outer optical slit region 503. Particles passing through a homogeneous region 621 of second optical signal 621 in a certain distance range from the sensor, which is described as sensor second sampling range, reflect/scatter light which is projected by the lens 615 to the outer optical slit region 503 and to the inner optical slit region. As the second optical signal is allowed to pass both through the inner optical slit region and the outer optical slit region 503, the reflected light passes through the slit 647 and reaches the photodetector. Particles passing through the homogeneous region 621 of the second optical signal and within the sensor second sampling range are therefore detected by the photodetector sensor. Particles, passing through the homogeneous region 621 of the second optical signal but outside of the sensor second sampling range, reflect/scatter light which is projected by the lens 615 to the blocking slit region 505. As the blocking slit region 505 is configured to block all optical signals, the second optical signal is blocked and does not reach the photodetector. Particles passing through the second optical signal but outside of the sensor second sampling range are therefore not detected by the photodetector sensor.

Particles interact with the first optical signal according to similar principles. In particular, particles passing through a homogeneous region of a first optical signal in a certain distance range from the sensor, which is described as sensor first sampling range, reflect/scatter light which is projected by a lens 615 to the inner optical slit region. As the first optical signal is allowed to pass through the inner optical slit region, the reflected light passes through the slit and reaches the photodetector. Particles passing through the homogeneous region of first optical signal and within sensor first sampling range are therefore detected by the photodetector sensor. Particles, passing through the homogeneous region of first optical signal but out of sensor first sampling range, reflect/scatter light which is projected by the lens 615 to the outer optical slit region or to the blocking slit region. As the outer optical slit region and the blocking slit region are configured to block the first optical signal, the first optical signal is blocked and does not reach the photodetector. Particles passing through the first optical signal but outside of the sensor first sampling range are therefore not detected by the photodetector sensor.

FIG. 6C visually shows the sensor sampling distance 661 and sensor second sampling range 663 for the second optical signal. In general, the optical slit 647 is configured to pass reflected/scattered light from particles passing within sensor sampling range 663 and to block reflected/scattered light from particles passing outside of the sensor sampling range 663.

Figure 7A:
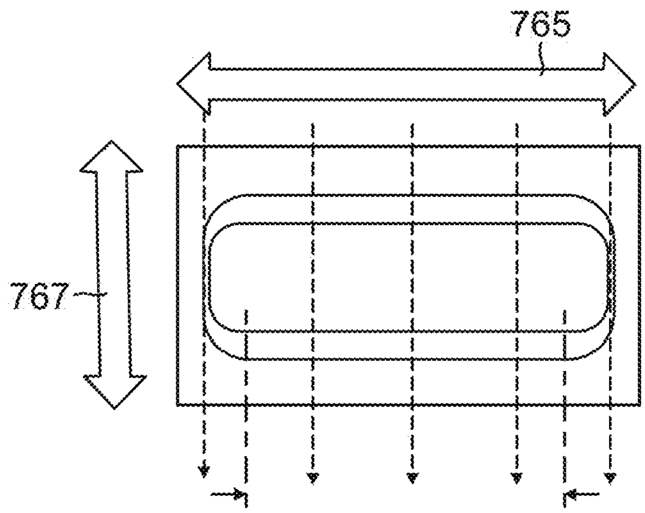
FIGS. 7A-7C are diagrams illustrating a nested slit according to an aspect of the present disclosure.
Figure 7B:
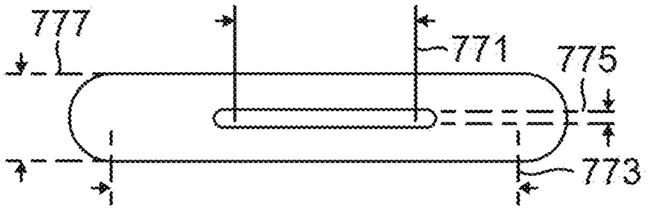
Figure 7C:
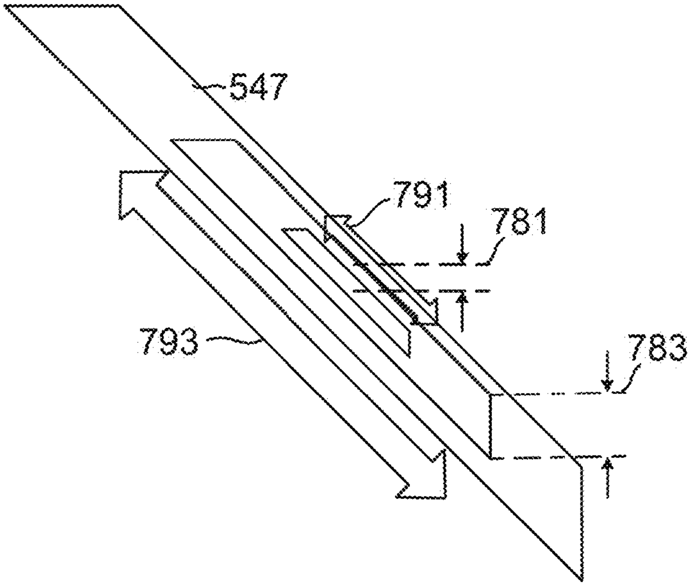

FIGS. 7A-7C characterize associations of optical signal beam profiles with inner optical slit region width and outer optical slit region width. FIG. 7A is an exemplary embodiment of a first optical signal beam profile and a second optical signal beam profile. In one axis 765, the beam may have a flat-top window profile and in the perpendicular axis 767, the beam may have a Gaussian profile. Airflow direction and therefore aerosol flow direction may be dominantly in the Gaussian axis 767, therefore particles may produce consistent optical response independently of the position within the homogeneous region of flat-top window axis 765. The homogeneous region of optical signal beam profile of flat-top window axis 765 is called an optical signal beam width. In general, the optical slit is configured to pass reflected/scattered light from particles passing through the homogeneous region of an optical signal beam and to block reflected/scattered light from particles passing outside of the homogeneous region of an optical signal beam.

FIG. 7B illustrates one of several possible configurations of the first optical signal beam and the second optical signal beam. In this example, axes of first and second optical signals are combined into a single axis, for example by usage of a dichroic laser beam combiner. The first optical signal has a first optical signal beam width 771, which is smaller than the second optical signal beam width 773. Therefore, the first sampling volume, related to the first optical signal beam width 771, is smaller than the second sampling volume. The second optical signal has a second optical signal beam width 773, which is larger than the first optical signal beam width 771. Therefore, the second sampling volume, related to the second optical signal beam width 773, is larger than the first sampling volume. The second optical signal Gaussian width 777 may be larger than the first optical signal Gaussian width 775. As optical power of a first optical signal source is focused into a smaller volume than the second optical signal volume, its energy density may be significantly higher compared to the second optical signal beam energy density. Therefore, the first optical signal may be preferred for detecting small particles, while the second optical signal may be preferred for detecting large particles.

FIG. 7C is an exemplary embodiment of the optical slit design described above in FIG. 5. The slit has an angle with respect to a receiving optics axis, which is associated with an angle between an optical beam axis and a receiving optics axis. The inner optical slit region is nested within outer optical slit region, and the inner optical slit region has a width 781 associated with a first optical signal beam width 771 and height 791 associated with the sensor first sampling range. The outer optical slit region is nested within the blocking slit region, and the outer optical slit region has a width 783 associated with a second optical signal beam width 773 and height 793 associated with a sensor second sampling range 663.

Figure 8:
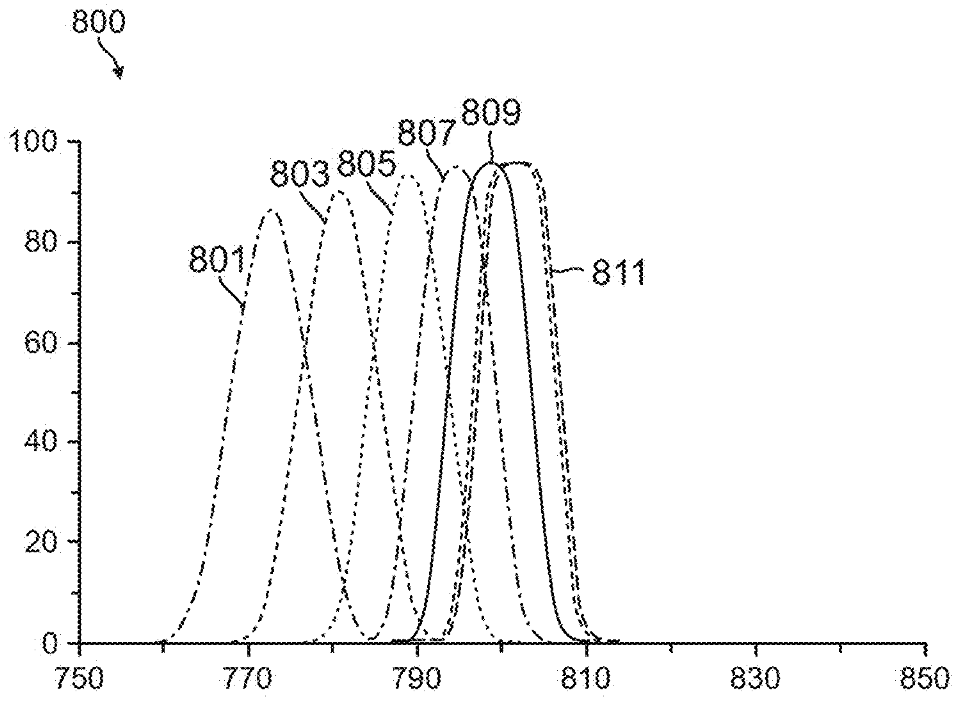
FIG. 8 is a graph illustrating the effects of an angle of incidence on the light wavelength that is passed through the slit according to an aspect of the present disclosure.

Optical filters are typically angle sensitive and are often designed for a zero degree angle of incidence, where the light is normal to the filter. The angle at which light is incident on an optical filter may affect the frequency of the pass band of the optical filter, as well as optical transmission and optical transmission slope of the filter. For example, FIG. 8 illustrates a graph 800 showing the passbands of an optical filter at particular frequencies based on the angle of incidence of the light. The information shown in graph 800 is known to one having skill in the art. In particular, the information in graphs 800 was acquired from https://www.thorlabs.com/newgrouppage9. cfm?objectgroup_id=10772. For example, the graph 800 illustrates multiple passbands 801-811. In particular, the passband 801 is associated with an angle of incidence of 30° and has a passband centered at an approximate wavelength of 772 nm. Also, the passband 803 is associated with an angle of incidence of 25° and has a passband centered at an approximate wavelength of 781 nm. Additionally, the passband 805 is associated with an angle of incidence of 20° and has a passband centered at an approximate wavelength of 788 nm. Further, the passband 807 is associated with an angle of incidence of 15° and has a passband centered at an approximate wavelength of 794 nm. Moreover, the passband 809 is associated with an angle of incidence of 10° and has a passband centered at an approximate wavelength of 798 nm. The passband 811 is associated with angles of incidence of 5° and 0° and has a passband centered at an approximate wavelength of 802 nm.

As the light angle of incidence on the optical filter can affect the passband of the optical filter, the optical filter of the slit may be shaped to adjust the angle of incidence on the optical filter. For example, as a particle moves through the detection volume for the second optical signal, the angle of incidence of received light on the slit changes based on the position of the particle within the detection volume. Thus, depending on the filter shape, the passband of the optical filter may change as the particle moves through the detection volume. The outer optical slit region is comprised of the optical filter; therefore, the shape of the outer optical slit region may be adjusted so the light angle of incidence is close to zero degrees or, alternatively, to keep the light angle of incidence approximately constant.

Figure 9A:
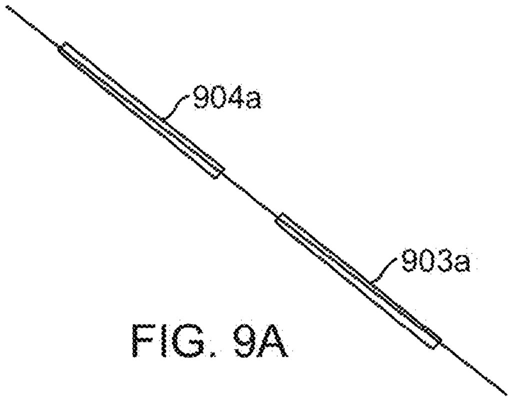
FIG. 9A-9C are cross-section views of different slit shapes according to an aspect of the present disclosure.
Figure 9B:
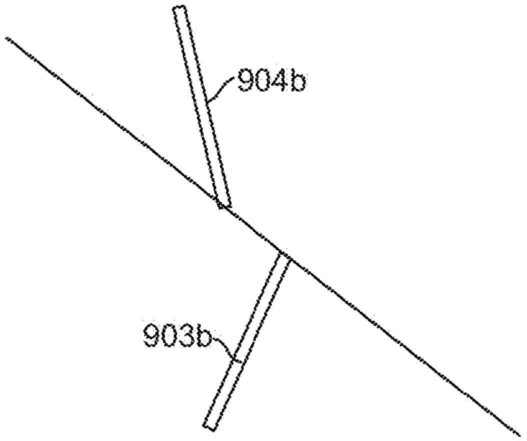
Figure 9C:
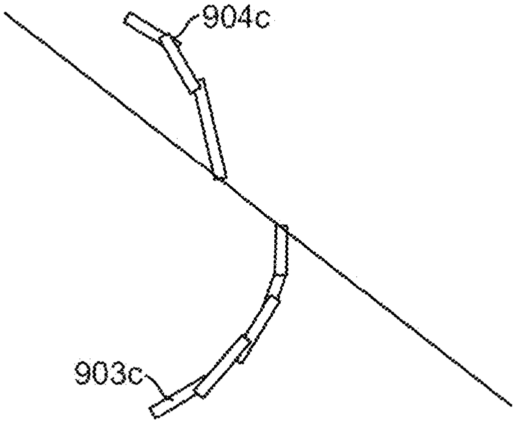

FIGS. 9A-9C illustrate several shapes of an outer optical slit region to adjust a light angle of incidence on a surface of the outer optical slit region. FIG. 9A illustrates a tilted outer optical slit region, where the outer optical slit region has a lower portion **903*a* and an upper portion 904*a*, where the lower portion 903*a* and the upper portion 904*a* are positioned along the same plane. FIG. 9B illustrates an outer optical slit region having a lower portion 903*b* and an upper portion 904*b*, where the lower portion 903*b* and upper portion 904*b* are each straight but lie along different axes. In some implementations, the upper portion and the lower portion may have different pass bands based on the angle of incidence of the received optical signal. FIG. 9C illustrates an outer optical slit region having a lower portion 903*c* and an upper portion 904*c*, where the lower portion 903*c* and upper portion 904*c*** are both curved to maintain consistency of the angle of incidence. The terms upper portion and lower portion are used herein to denote the relative position of the different portions to each other and do not indicate that one is always positioned above the other portion. In particular, the terms upper and lower indicate that they are separate portions of the optical filter separated by the inner optical slit region along the axis that received light travels as a particle travels through the detection volume.

Figure 10:
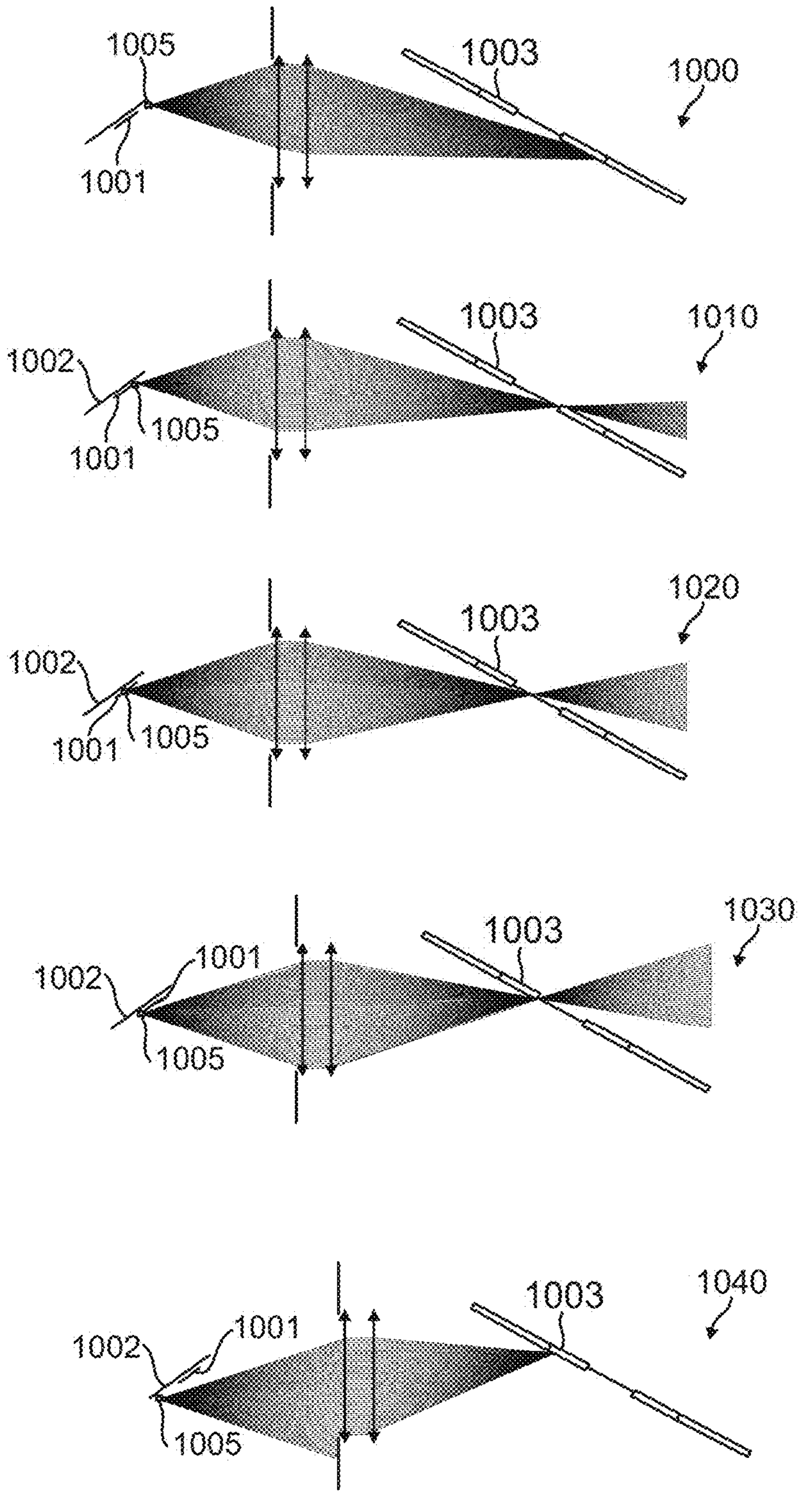
FIG. 10 is a series of drawings showing the detection of a particle passing within a detection volume using a particular slit shape according to an aspect of the present disclosure.
Figure 11:
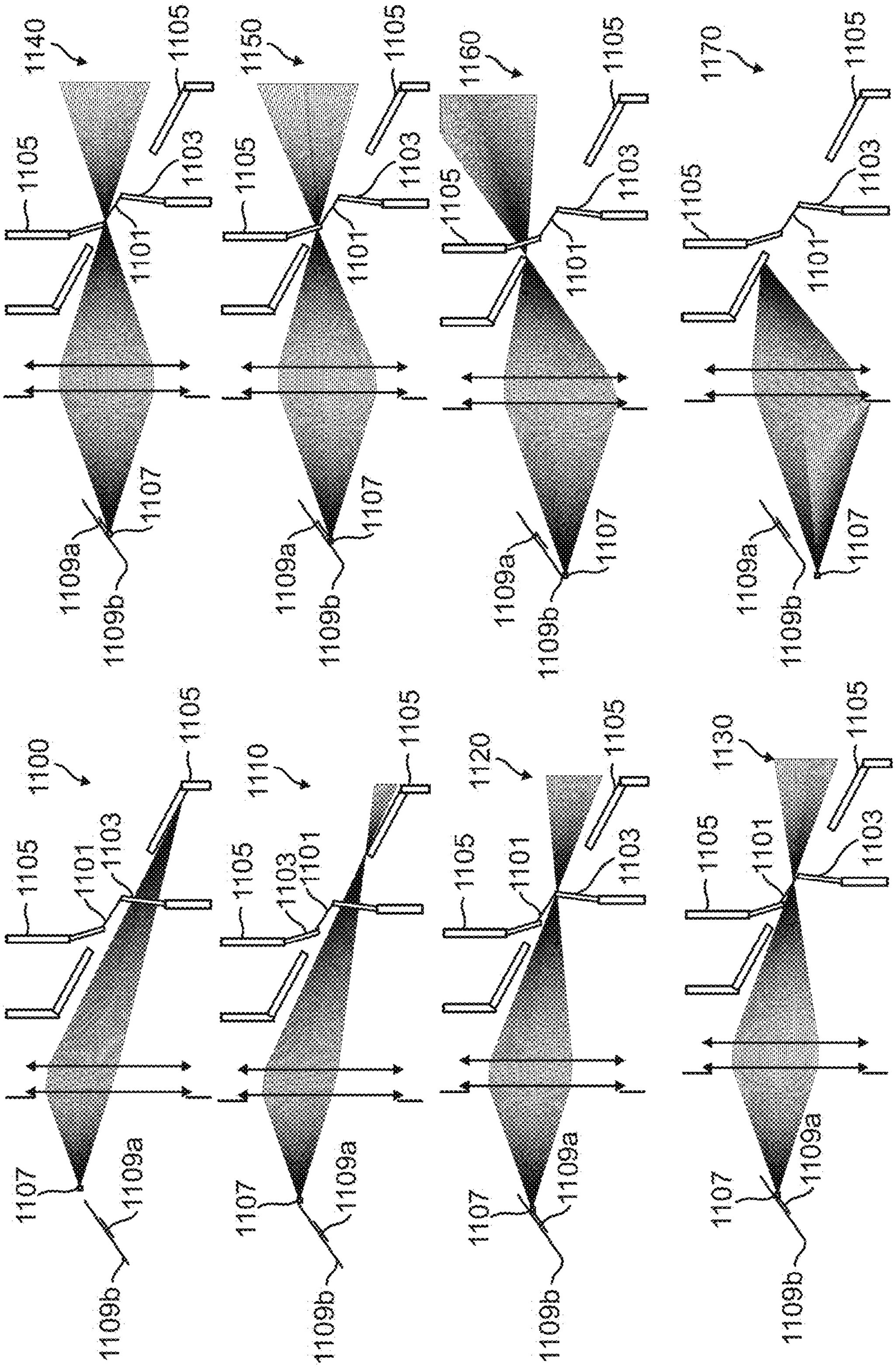
FIG. 11 is a series of drawings showing the detection of a particle passing within a detection volume using a particular slit shape and a second optical signal according to an aspect of the present disclosure.
Figure 12:
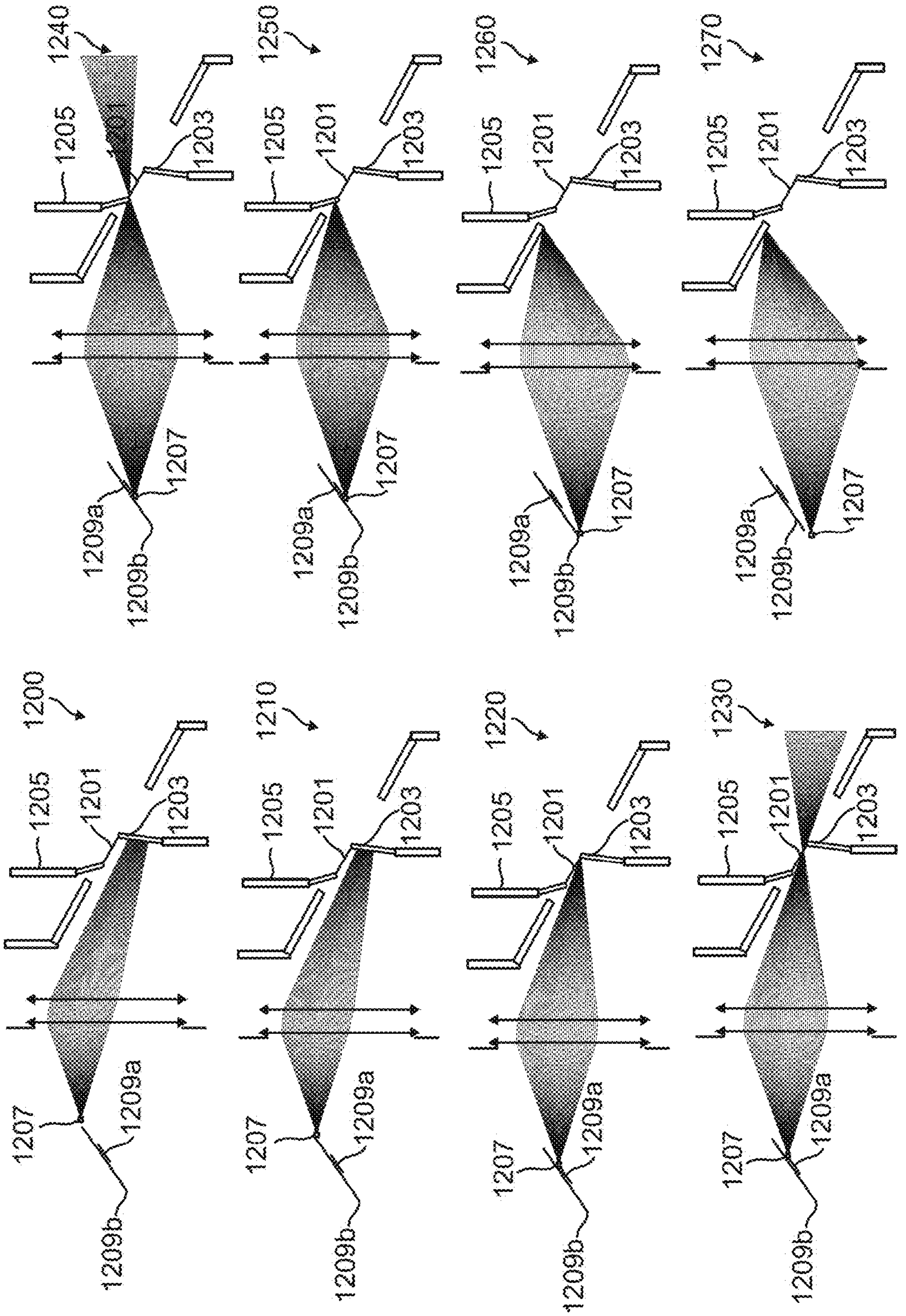
FIG. 12 is a series of drawing showing the detection of a particle passing within a detection volume using a slit shape and a first optical signal according to an aspect of the present disclosure.

FIGS. 10-12 illustrate the effects of optical filter shape on the angle of incidence of light as a particle passes through the detection volume. In particular, FIG. 10 illustrates multiple positions of a particle 1005 with respect to a first detection volume 1001 and the second detection volume 1002, where the outer optical slit region 1003 in the slit is linearly shaped along an angled plane. FIG. 10 describes a scenario where a first optical signal source emits an optical beam and the second optical signal source is turned off. As shown at position 1000, the particle 1005 is located outside the first detection volume 1001 and above the first detection volume 1001. As such, the light reflected/scattered off of the particle 1005 may be incident on the lower portion of the outer optical slit region 1003 at a high angle of incidence. The first optical signal is blocked by the outer optical slit region 1003. Further, the angle of incidence of the reflected/scattered light begins to decrease.

Further, at position 1010, the particle 1005 is located just inside the upper boundary of the first detection volume 1001. As such, the light reflected/scattered off of the particle 1005 enters the inner optical slit region and passes through the inner optical slit region. Further, the angle of incidence of the reflected/scattered light begins to decrease. Also, at position 1020, the particle 1005 is located at the center of the first detection volume 1001. As such, the light reflected/scattered off of the particle 1005 is directed to the center of the inner optical slit region and passes through inner optical slit region. At position 1030, the particle 1005 is located just inside the lower boundary of the first detection volume 1001.

As such, the light reflected/scattered off of the particle 1005 is about to impact the surface of the outer optical slit region 1003. Thus, the light reflected/scattered off of the particle 1005 will begin to be blocked by the outer optical slit region 1003.

At position 1040, the particle 1005 is located farther from the first detection volume 1001. As such, the light is incident on the outer optical slit region 1003 at an increasingly smaller angle of incidence. Thus, with the linear outer optical slit region 1003, the angle of incidence changes as the particle 1005 passes through the detection volume. As the angle of incidence changes significantly as an optical signal is swept across the linearly shaped outer optical slit region 1003, the filter passband of the outer optical slit region 1003 may also change, affecting the efficiency of the optical filter with respect to the first optical signal 219 and the second optical signal 229.

FIG. 11 illustrates multiple positions of a particle 1107 being detected by a second optical signal with respect to a first detection volume 1109*a* and a second detection volume 1109*b*, where the first detection volume 1109*a* is associated with detection by a first optical signal and the second detection volume 1109*b* is associated with detection by a second optical signal. Further, the slit includes an inner optical slit region 1101, an outer optical slit region 1103, and a blocking slit region 1105, where the different components of the slit are positioned in relation to each other to cause the angle of incidence to be more consistent as the particle 1107 moves through the first detection volume 1109*a* and the second detection volume 1109*b*. As shown at position 1100, the particle 1107 is located outside and above both the first detection volume 1109*a* and the second detection volume 1109*b*. As such, the light reflected off the particle 1107 may be incident on a portion of the blocking slit region 1105. For example, the blocking slit region 1105 may include multiple fragments, such that when the particle is some positions, the reflected/scattered second optical signal may pass through the outer optical slit region 1103 and then be blocked on a fragmented portion of the blocking slit region 1105. Also, some fragmented portions of the blocking slit region 1105 may be in front of portions of the outer optical slit region 1103. Other fragmented portions of the blocking slit region 1105 may be contiguous with the portions of the outer optical slit region 1103. At position 1110, the particle 1107 is now within the second detection volume 1109*b* but outside and above the first detection volume 1109*a*. As such, the second optical signal reflected/scattered off of the particle 1107 passes through a lower portion of the outer optical slit region 1103 that is positioned differently from the upper portion of the optical filter 1103. The different positioning of the upper and lower portions may cause the angle of incidence to be more consistent as the particle 1107 moves through the detection volumes 1109*a* and 1109*b*.

Further, at position 1120, the particle 1107 is located just outside the upper boundary of the first detection volume 1109*a* but inside the second detection volume 1109*b*. As such, the light reflected/scattered off of the particle 1107 passes through the outer optical slit region 1103 and is about to enter the inner optical slit region 1101. Further, because of the shape of the outer optical slit region 1103, the angle of incidence of the reflected light remains relatively constant. Also, at positions 1130 and 1140, the particle 1107 has moved into the first detection volume 1109*a*, which is within the second detection volume 1109*b*. The second optical signal reflected/scattered from the particle 1107 now passes through the inner optical slit region 1101.

Additionally, at position 1150, the particle 1107 has moved out of the first detection volume 1109*a* while remaining in the second detection volume 1109*b*. As such, the reflected/scattered second optical signal now passes through the upper portion of the outer optical slit region 1103. At position 1160, the particle 1107 is moving close to the lower boundary of the second detection volume 1109*b*. As such, the reflected/scattered second optical signal passes through the upper portion of the outer optical slit region 1103 at an angle of incidence that is similar to when the second optical signal passes through the lower portion of the outer optical slit region 1103. At position 1170, the particle 1107 has moved out of the second detection volume 1109*b*. As such, the reflected/scattered second optical signal is blocked by the upper portion of the blocking slit region 1105. As shown, the blocking slit region 1105 can have multiple fragments that are both in front of, behind or in line with either the upper or lower portions of the outer optical slit region 1103.

FIG. 12 illustrates multiple positions of a particle 1207 being detected by a first optical signal with respect to a first detection volume 1209*a* and a second detection volume 1209*b*, where the first detection volume 1209*a* is associated with detection by a first optical signal and the second detection volume 1209*b* is associated with detection by a second optical signal. Further, the slit includes an inner optical slit region 1201, an outer optical slit region 1203, and a blocking slit region 1205, where the different components of the slit are positioned in relation to each other to cause the angle of incidence to be more consistent as the particle 1207 moves through the first detection volume 1209*a* and the second detection volume 1209*b*. As shown at position 1200, the particle 1207 is located outside and above both the first detection volume 1209*a* and the second detection volume 1209*b*. As such, the first optical signal reflected/scattered off the particle 1207 may be blocked by the outer optical slit region 1203. At position 1210, the particle 107 is now within the second detection volume 1209*b* but outside and above the first detection volume 1009*a*. As such, the first optical signal reflected/scattered off of the particle 1207 is still blocked by the lower portion of the outer optical slit region 1203.

Further, at position 1220, the particle 1207 is located just outside the upper boundary of the first detection volume 1209*a* but inside the second detection volume 1209*b*. As such, the first optical signal reflected/scattered off of the particle 1207 is still blocked by the outer optical slit region 1203 but is about to enter the inner optical slit region 1201. Also, at positions 1230 and 1240, the particle 1207 has moved into the first detection volume 1209*a*, which is within the second detection volume 1209*b*. The first optical signal reflected/scattered from the particle 1207 now passes through the inner optical slit region 1201.

Additionally, at position 1250, the particle 1207 has moved out of the first detection volume 1209*a* while remaining in the second detection volume 1209*b*. As such, the reflected/scattered first optical signal is now blocked by the upper portion of the outer optical slit region 1203. At position 1260, the particle 1207 is moving close to the lower boundary of the second detection volume 1209*b*. As such, the reflected/scattered first optical signal is still blocked by the upper portion of the outer optical slit region 1203. At position 1270, the particle 1207 has moved out of the second detection volume 1209*b*. As such, the reflected/scattered first optical signal is blocked by the upper portion of the blocking slit region 1205.

Figure 13A:
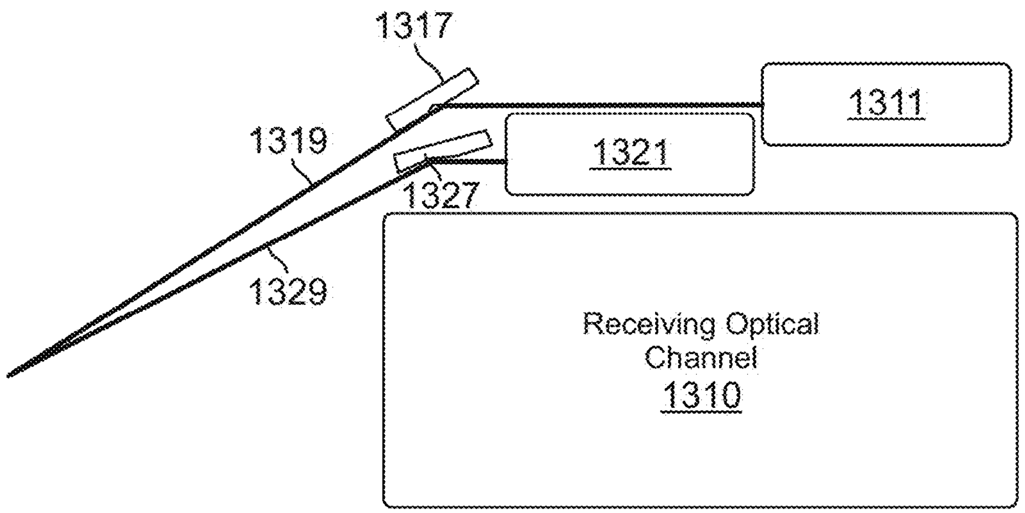
FIGS. 13A and 13B are block diagrams illustrating the placement of laser sources within an optical sensor according to an aspect of the present disclosure.
Figure 13B:
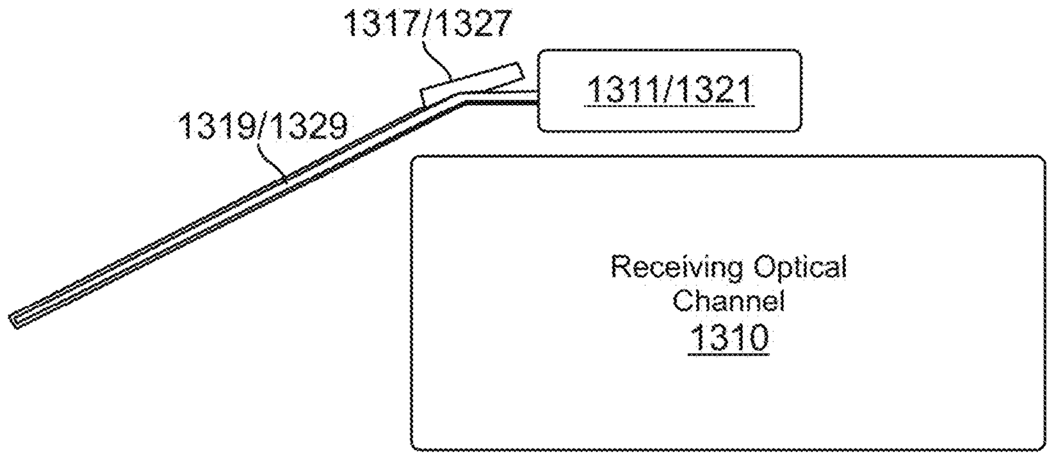

FIGS. 13A and 13B illustrate different positions of the optical signal sources in relation to a receiving optical channel 1310. For example, FIG. 13A illustrates a first optical signal source 1311 and a second optical signal source 1321, where the first optical signal source 1311 and the second optical signal source 1321 are vertically stacked. As such, the first optical signal source 1311 emits the first optical signal 1319 towards a first mirror 1317 above the second optical signal source 1321, which emits the second optical signal 1329 towards a second mirror 1327. When the first optical signal 1319 or the second optical signal 1329 is reflected by a particle, the reflected light may be received by a receiving optical channel 1310. FIG. 13B illustrates a first optical signal source 1311 and a second optical signal source 1321 located horizontally next to each other. As such, the first mirror 1317 and the second mirror 1327 may be mirrors located next to each other or a single mirror that reflects the first optical signal 1319 and the second optical signal 1329. In designs where the first beam axis needs to be unified with the second beam axis, the beams can be combined using a dichroic beam combiner, as the first optical signal and the second optical signal may utilize distinctly separate wavelengths.

Figure 14:
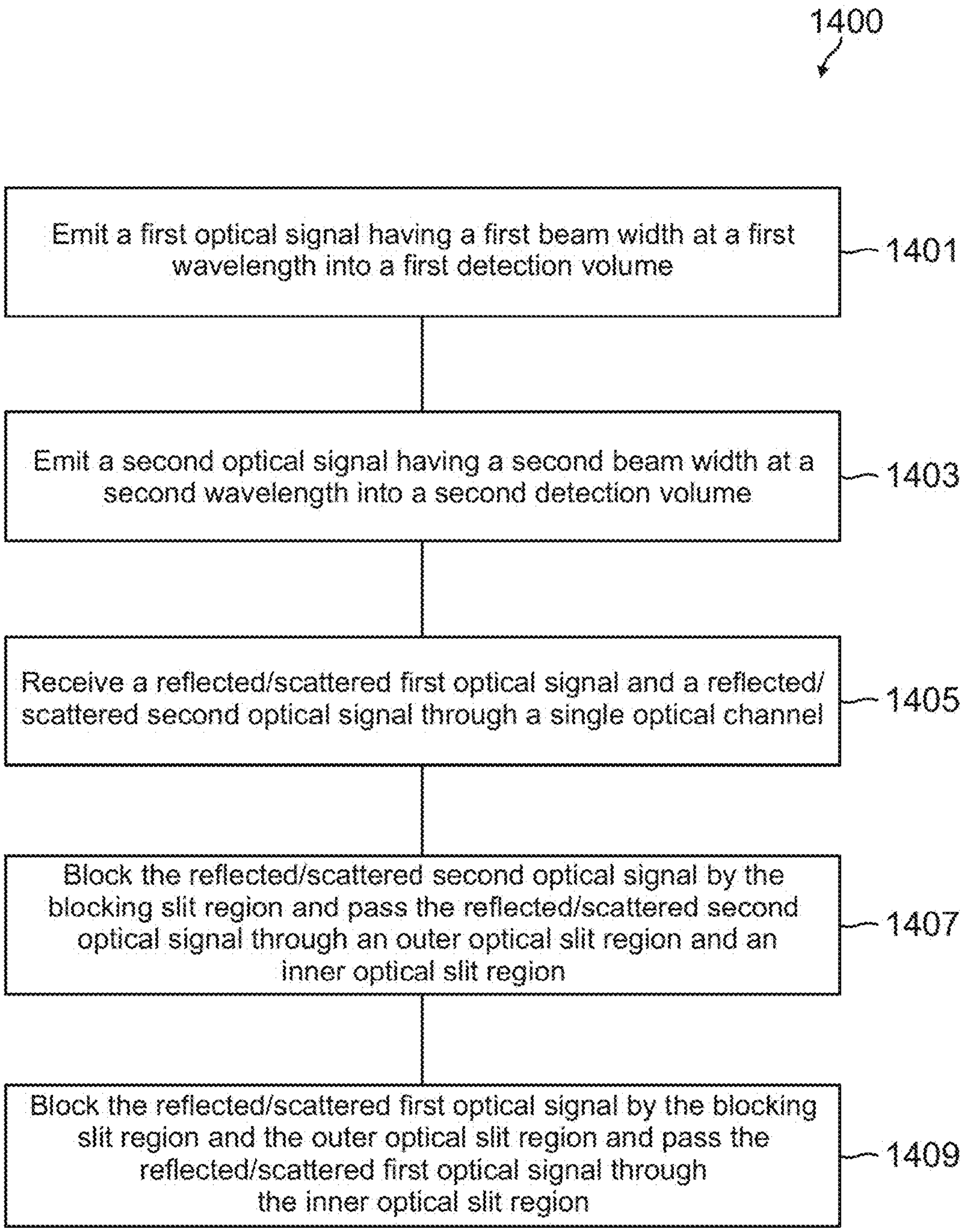
FIG. 14 is a flowchart diagram of a method for receiving different signals through a single optical channel according to an aspect of the present disclosure.

FIG. 14 is a flowchart diagram of a method 1400 for receiving multiple optical signals through a single receiving optical channel. The method 1400 proceeds at 1401, where a first optical signal having a first beam width at a first wavelength is emitted into a first detection volume. The method 1400 proceeds at 1403, where a second optical signal having a second beam width at a second wavelength is emitted into a second detection volume. In some implementations, when the first and second optical signals are emitted, the first and second optical signals may be emitted by first and second optical signal sources respectively. Further, to cause the first optical signal to have the first beam width, the first optical signal may be passed through a first beam shaper that shapes the first optical signal to have the first beam width, which is associated with a first particle size range. For example, the first particle size range may cover smaller particles as described above. Also, to cause the second optical signal to have the second beam width, the second optical signal may be passed through a second beam shaper that shapes the second optical signal to have the second beam width, which is associated with a second particle size range. For example, the second particle size range may cover larger particles than the first particle size range, which is described above. Additionally, the first optical signal source and the second optical signal source may be triggered to alternatingly generate the first optical signal and the second optical signal.

In certain embodiments, the method 1400 proceeds at 1405, where a reflected/scattered first optical signal and a reflected/scattered second optical signal are received through a single optical channel. For example, the reflected first optical signal may be a portion of the first optical signal that is reflected by a first particle in the first detection volume, and the reflected second optical signal is a portion of the second optical signal that is reflected by a second particle in the second detection volume. Further, after receiving the reflected first and second optical signals, the reflected optical signals may be passed through a solar filter. The solar filter has a passband that passes the signal having the first wavelength and the second wavelength.

In additional embodiments, the method 1400 proceeds at 1407, where the reflected or scattered second optical signal is blocked by the blocking slit region and where the reflected or scattered second optical signal is passed through an outer optical slit region positioned within a blocking slit region and is passed through an inner optical slit region positioned within the outer optical slit region. Further, the width of the outer optical slit region corresponds to the second beam width of the second optical signal. The method 1400 proceeds at 1409, where the reflected or scattered first optical signal is blocked by the blocking slit region and is blocked by the outer optical slit region and where the reflected or scattered first optical signal is passed through an inner optical slit region. Further, the width of the inner optical slit region corresponds to the first beam width of the first optical signal.

In further embodiments, the reflected or scattered first optical signal and the reflected or scattered second optical signal may be provided to a polarization splitter after passing through the optical slit, wherein the polarization splitter provides the received optical signals to different photodetectors based on polarization of at least one of the reflected first optical signal and the reflected second optical signal. Additionally, electrical signals may be processed when the reflected first optical signal and the reflected second optical signal are detected. In particular the electrical signals may be processed for either the first particle size range or the second particle size range based on whether the first optical signal is generated or the second optical signal is generated.

EXAMPLE EMBODIMENTS

Example 1 includes an apparatus, the apparatus configured to function as an optical slit that receives multiple optical signals from multiple detection volumes, the apparatus having an angle with respect to a receiving optics axis, wherein the angle is associated with the angle between an optical signal beam axis and the receiving optics axis, the apparatus comprising: an inner optical slit region having a first width and a first height, wherein the first width is associated with a first optical signal in the multiple optical signals having a first optical signal beam width, and the first height is associated with a first sensor sampling range; an outer optical slit region having a second width and a second height, wherein the second width is associated with a second optical signal in the multiple optical signals having a second optical signal beam width, and the second height is associated with a second sensor sampling range; and a blocking slit region configured to block the first optical signal and the second optical signal that are incident on the blocking slit region; wherein the inner optical slit region is associated with a first optical signal wavelength and a second optical signal wavelength, wherein the outer optical slit region is associated with the second optical signal wavelength; wherein the inner optical slit region is nested within the outer optical slit region and the outer optical slit region is nested within the blocking slit region.

Example 2 includes the apparatus of Example 1, wherein the optical slit is configured to: pass the first optical signal through the inner optical slit region that has been reflected or scattered off of particles moving through a first optical signal beam and pass the second optical signal through the inner optical slit region that has been reflected or scattered off of particles moving through a second optical signal beam; and block the first optical signal that is incident on the outer optical slit region that has been reflected or scattered off of the particles moving through the first optical signal beam and pass the second optical signal through the outer optical slit region that has been reflected or scattered off of the particles moving through the second optical signal beam.

Example 3 includes the apparatus of any of Examples 1-2, wherein the multiple optical signals pass through a solar filter having a wide passband including wavelengths of the first optical signal and the second optical signal or the solar filter having a first passband for the first optical signal wavelength and a second passband for the second optical signal wavelength.

Example 4 includes the apparatus of any of Examples 1-3, wherein the optical slit is optically coupled to provide the multiple optical signals that pass through at least one of the inner optical slit region and the outer optical slit region to a polarization beamsplitter, wherein the polarization beamsplitter provides the multiple optical signals to different photodetectors based on polarizations of the multiple optical signals.

Example 5 includes the apparatus of any of Examples 1-4, wherein the outer optical slit region is an optical filter having a passband that includes the second optical signal wavelength and wherein the inner optical slit region is at least one of: a window; and an optical filter having a passband that includes the first optical signal wavelength and the second optical signal wavelength.

Example 6 includes the apparatus of any of Examples 1-5, wherein the outer optical slit region is shaped based on an angle of incidence of the multiple optical signals on an optical filter.

Example 7 includes the apparatus of Example 6, wherein the outer optical slit region is curved to cause the angle of incidence of the multiple optical signals from different positions within the first optical signal beam and the second optical signal beam to remain constant.

Example 8 includes the apparatus of any of Examples 1-7, wherein the outer optical slit region comprises: an upper portion; and a lower portion; wherein the upper portion is positioned along a different plane than the lower portion.

Example 9 includes the apparatus of any of Examples 1-8, wherein the blocking slit region comprises a plurality of fragmented portions, wherein the plurality of fragmented portions are positioned at locations that are at least one of: in front of an optical filter, wherein the blocking slit region blocks the multiple optical signals that would be incident on the optical filter but for the multiple optical signals being first incident on the blocking slit region; behind the optical filter, wherein the blocking slit region blocks the multiple optical signals after the multiple optical signals have passed through the optical filter; and contiguous with the optical filter, wherein the blocking slit region blocks the multiple optical signals that would not be incident on the outer optical slit region or the inner optical slit region.

Example 10 includes a method comprising: emitting a first optical signal having a first optical signal beam with a first beam width at a first wavelength into a first detection volume; emitting a second optical signal having a second optical signal beam with a second beam width at a second wavelength into a second detection volume; receiving a reflected or scattered first optical signal and a reflected or scattered second optical signal through a single receiving optical channel, wherein the reflected or scattered first optical signal is a portion of the first optical signal reflected or scattered by a particle in the first optical signal beam, and the reflected or scattered second optical signal is a portion of the second optical signal reflected or scattered by a second particle in the second optical signal beam; passing the reflected or scattered second optical signal through an inner optical slit region and an outer optical slit region and blocking the reflected or scattered second optical signal that is incident on a blocking slit region; and passing the reflected or scattered first optical signal through the inner optical slit region and blocking the reflected or scattered first optical signal that is incident on the outer optical slit region and the blocking slit region; wherein the inner optical slit region is nested within the outer optical slit region and the outer optical slit region is nested within the blocking slit region.

Example 11 includes the method of Example 10, further comprising passing the reflected or scattered first optical signal and the reflected or scattered second optical signal through a solar filter, wherein the solar filter has at least one of: a wide passband including wavelengths of the first optical signal and the second optical signal; and a first passband for the first wavelength and a second passband for the second wavelength.

Example 12 includes the method of any of Examples 10-11, further comprising providing the reflected or scattered first optical signal and the reflected or scattered second optical signal to a polarization beamsplitter after passing through an optical slit, wherein the polarization beamsplitter provides the received first optical signal and the received second optical signal to different photodetectors based on polarization of at least one of the received first optical signal and the received second optical signal.

Example 13 includes the method of any of Examples 10-12, wherein emitting the first optical signal having the first beam width and emitting the second optical signal having the second beam width further comprises: generating the first optical signal at a first optical signal source; passing the first optical signal through a first beam shaper, wherein the first beam shaper shapes the first optical signal to have the first beam width, wherein the first beam width is associated with a first particle size range; generating the second optical signal at a second optical signal source; and passing the second optical signal through a second beam shaper, wherein the second beam shaper shapes the second optical signal to have the second beam width, wherein the second beam width is associated with a second particle size range.

Example 14 includes the method of Example 13, further comprising alternating between generating the first optical signal by the first optical signal source and generating the second optical signal by the second optical signal source.

Example 15 includes the method of Example 14, further comprising processing electrical signals produced by detecting one of the reflected or scattered first optical signal and the reflected or scattered second optical signal for either the first particle size range or the second particle size range based on whether the first optical signal is generated, or the second optical signal is generated.

Example 16 includes a system comprising: a first optical signal source configured to emit a first optical signal at a first wavelength; a second optical signal source configured to emit a second optical signal at a second wavelength, wherein the first optical signal is emitted at a first beam width and the second optical signal is emitted at a second beam width towards at least one detection volume; and a receiving optical channel configured to receive reflected/scattered portions of the first optical signal and the second optical signal from particles passing through the at least one detection volume, wherein the receiving optical channel comprises an optical slit and the receiving optical channel directs the received reflected/scattered portions through the optical slit.

Example 17 includes the system of Example 16, wherein the optical slit comprises: a blocking slit region configured to block the first optical signal and the second optical signal; an outer optical slit region located within the blocking slit region, wherein the outer optical slit region has a passband at the second wavelength and blocks the first optical signal; and an inner optical slit region located within the outer optical slit region which allows the first optical signal and the second optical signal to pass through.

Example 18 includes the system of Example 17, wherein the receiving optical channel further comprises: a polarization beamsplitter; a first photodetector; and a second photodetector, wherein the optical slit is optically coupled to provide the received optical signals that pass through at least one of the inner optical slit region and the outer optical slit region to the polarization beamsplitter, wherein the polarization beamsplitter provides the received optical signals to the first photodetector and the second photodetector based on the polarization of the reflected/scattered portions of the first optical signal and the second optical signal.

Example 19 includes the system of any of Examples 16-18, wherein the receiving optical channel further comprises at least one of: a solar filter having wide passband including wavelengths of first and second optical signal; and a solar filter having first passband for the first optical signal wavelength and second passband for the second optical signal wavelength.

Example 20 includes the system of any of Examples 16-19, wherein an optical filter is shaped to maintain a constant angle of incidence on the optical filter of the reflected/scattered portions of the first optical signal and the second optical signal when the particles move through the at least one optical signal beam.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An apparatus, the apparatus configured to function as an optical slit that receives multiple optical signals from multiple detection volumes, the apparatus having an angle with respect to a receiving optics axis, wherein the angle is associated with the angle between an optical signal beam axis and the receiving optics axis, the apparatus comprising:

an inner optical slit region having a first width and a first height, wherein the first width is associated with a first optical signal in the multiple optical signals having a first optical signal beam width, and the first height is associated with a first sensor sampling range;

an outer optical slit region having a second width and a second height, wherein the second width is associated with a second optical signal in the multiple optical signals having a second optical signal beam width, and the second height is associated with a second sensor sampling range; and a blocking slit region configured to block the first optical signal and the second optical signal that are incident on the blocking slit region;

wherein the inner optical slit region is associated with a first optical signal wavelength and a second optical signal wavelength, wherein the outer optical slit region is associated with the second optical signal wavelength;

wherein the inner optical slit region is nested within the outer optical slit region and the outer optical slit region is nested within the blocking slit region.

2. The apparatus of claim 1, wherein the optical slit is configured to:

pass the first optical signal through the inner optical slit region that has been reflected or scattered off of particles moving through a first optical signal beam and pass the second optical signal through the inner optical slit region that has been reflected or scattered off of particles moving through a second optical signal beam; and block the first optical signal that is incident on the outer optical slit region that has been reflected or scattered off of the particles moving through the first optical signal beam and pass the second optical signal through the outer optical slit region that has been reflected or scattered off of the particles moving through the second optical signal beam.

3. The apparatus of claim 1, wherein the multiple optical signals pass through a solar filter having a wide passband including wavelengths of the first optical signal and the second optical signal or the solar filter having a first passband for the first optical signal wavelength and a second passband for the second optical signal wavelength.

4. The apparatus of claim 1, wherein the optical slit is optically coupled to provide the multiple optical signals that pass through at least one of the inner optical slit region and the outer optical slit region to a polarization beamsplitter, wherein the polarization beamsplitter provides the multiple optical signals to different photodetectors based on polarizations of the multiple optical signals.

5. The apparatus of claim 1, wherein the outer optical slit region is an optical filter having a passband that includes the second optical signal wavelength and wherein the inner optical slit region is at least one of:

a window; and an optical filter having a passband that includes the first optical signal wavelength and the second optical signal wavelength.

6. The apparatus of claim 1, wherein the outer optical slit region is shaped based on an angle of incidence of the multiple optical signals on an optical filter.

7. The apparatus of claim 6, wherein the outer optical slit region is curved to cause the angle of incidence of the multiple optical signals from different positions within the first optical signal beam and the second optical signal beam to remain constant.

8. The apparatus of claim 1, wherein the outer optical slit region comprises:

an upper portion; and a lower portion;

wherein the upper portion is positioned along a different plane than the lower portion.

9. The apparatus of claim 1, wherein the blocking slit region comprises a plurality of fragmented portions, wherein the plurality of fragmented portions are positioned at locations that are at least one of:

in front of an optical filter, wherein the blocking slit region blocks the multiple optical signals that would be incident on the optical filter but for the multiple optical signals being first incident on the blocking slit region;

behind the optical filter, wherein the blocking slit region blocks the multiple optical signals after the multiple optical signals have passed through the optical filter; and contiguous with the optical filter, wherein the blocking slit region blocks the multiple optical signals that would not be incident on the outer optical slit region or the inner optical slit region.

10. A method comprising:

emitting a first optical signal having a first optical signal beam with a first beam width at a first wavelength into a first detection volume;

emitting a second optical signal having a second optical signal beam with a second beam width at a second wavelength into a second detection volume;

receiving a reflected or scattered first optical signal and a reflected or scattered second optical signal through a single receiving optical channel, wherein the reflected or scattered first optical signal is a portion of the first optical signal reflected or scattered by a particle in the first optical signal beam, and the reflected or scattered second optical signal is a portion of the second optical signal reflected or scattered by a second particle in the second optical signal beam;

passing the reflected or scattered second optical signal through an inner optical slit region and an outer optical slit region and blocking the reflected or scattered second optical signal that is incident on a blocking slit region; and passing the reflected or scattered first optical signal through the inner optical slit region and blocking the reflected or scattered first optical signal that is incident on the outer optical slit region and the blocking slit region;

wherein the inner optical slit region is nested within the outer optical slit region and the outer optical slit region is nested within the blocking slit region.

11. The method of claim 10, further comprising passing the reflected or scattered first optical signal and the reflected or scattered second optical signal through a solar filter, wherein the solar filter has at least one of:

a wide passband including wavelengths of the first optical signal and the second optical signal; and a first passband for the first wavelength and a second passband for the second wavelength.

12. The method of claim 10, further comprising providing the reflected or scattered first optical signal and the reflected or scattered second optical signal to a polarization beamsplitter after passing through an optical slit, wherein the polarization beamsplitter provides the received first optical signal and the received second optical signal to different photodetectors based on polarization of at least one of the received first optical signal and the received second optical signal.

13. The method of claim 10, wherein emitting the first optical signal having the first beam width and emitting the second optical signal having the second beam width further comprises:

generating the first optical signal at a first optical signal source;

passing the first optical signal through a first beam shaper, wherein the first beam shaper shapes the first optical signal to have the first beam width, wherein the first beam width is associated with a first particle size range;

generating the second optical signal at a second optical signal source; and passing the second optical signal through a second beam shaper, wherein the second beam shaper shapes the second optical signal to have the second beam width, wherein the second beam width is associated with a second particle size range.

14. The method of claim 13, further comprising alternating between generating the first optical signal by the first optical signal source and generating the second optical signal by the second optical signal source.

15. The method of claim 14, further comprising processing electrical signals produced by detecting one of the reflected or scattered first optical signal and the reflected or scattered second optical signal for either the first particle size range or the second particle size range based on whether the first optical signal is generated, or the second optical signal is generated.

16. A system comprising:

a first optical signal source configured to emit a first optical signal at a first wavelength;

a second optical signal source configured to emit a second optical signal at a second wavelength, wherein the first optical signal is emitted at a first beam width and the second optical signal is emitted at a second beam width towards at least one detection volume; and a receiving optical channel configured to receive reflected/scattered portions of the first optical signal and the second optical signal from particles passing through the at least one detection volume, wherein the receiving optical channel comprises an optical slit and the receiving optical channel directs the received reflected/scattered portions through the optical slit;

an optical filter, wherein the optical filter is shaped to maintain a constant angle of incidence on the optical filter of the reflected/scattered portions of the first optical signal and the second optical signal when the particles move through the at least one optical signal beam.

17. The system of claim 16, wherein the optical slit comprises:

a blocking slit region configured to block the first optical signal and the second optical signal;

an outer optical slit region located within the blocking slit region, wherein the outer optical slit region has a passband at the second wavelength and blocks the first optical signal; and an inner optical slit region located within the outer optical slit region which allows the first optical signal and the second optical signal to pass through.

18. The system of claim 17, wherein the receiving optical channel further comprises:

a polarization beamsplitter;

a first photodetector; and a second photodetector, wherein the optical slit is optically coupled to provide the received optical signals that pass through at least one of the inner optical slit region and the outer optical slit region to the polarization beamsplitter, wherein the polarization beamsplitter provides the received optical signals to the first photodetector and the second photodetector based on the polarization of the reflected/scattered portions of the first optical signal and the second optical signal.

19. The system of claim 16, wherein the receiving optical channel further comprises at least one of:

a solar filter having wide passband including wavelengths of first and second optical signal; and a solar filter having first passband for the first optical signal wavelength and second passband for the second optical signal wavelength.

* * * * *